United States Patent [19]
Jain et al.

[11] Patent Number: 5,806,075
[45] Date of Patent: *Sep. 8, 1998

[54] METHOD AND APPARATUS FOR PEER-TO-PEER DATA REPLICATION

[75] Inventors: Sandeep Jain, Belmont; Dean Daniels, Fremont, both of Calif.

[73] Assignee: Oracle Corporation, Redwood Shores, Calif.

[ * ] Notice: The term of this patent shall not extend beyond the expiration date of Pat. No. 5,737,601.

[21] Appl. No.: 783,156

[22] Filed: Jan. 14, 1997

Related U.S. Application Data

[63] Continuation of Ser. No. 479,075, Jun. 6, 1995, abandoned, which is a continuation of Ser. No. 126,586, Sep. 24, 1993, abandoned.

[51] Int. Cl.$^6$ ............................... G06F 7/00; G06F 17/30
[52] U.S. Cl. ................................. 707/201; 707/8; 707/10; 395/200.6; 395/182.13
[58] Field of Search ...................................... 395/608, 609, 395/616, 617, 200.6; 707/8, 9, 200, 201

[56] References Cited

U.S. PATENT DOCUMENTS

| | | | |
|---|---|---|---|
| 4,077,059 | 2/1978 | Cordi et al. ............................. | 395/608 |
| 4,558,413 | 12/1985 | Schmidt et al. ........................ | 395/601 |
| 4,631,673 | 12/1986 | Haas et al. .............................. | 395/610 |
| 4,635,189 | 1/1987 | Kendall ................................... | 395/612 |
| 4,646,229 | 2/1987 | Boyle ...................................... | 395/601 |
| 4,648,036 | 3/1987 | Gallant .................................... | 395/608 |
| 4,714,992 | 12/1987 | Gladney et al. ........................ | 395/610 |
| 4,853,843 | 8/1989 | Ecklund .................................. | 395/601 |
| 4,875,159 | 10/1989 | Cary et al. .............................. | 364/269 |
| 5,043,871 | 8/1991 | Nishigaki et al. ...................... | 395/621 |
| 5,155,848 | 10/1992 | Aoshima ................................. | 395/601 |

(List continued on next page.)

FOREIGN PATENT DOCUMENTS 0428264   5/1991   European Pat. Off. .

OTHER PUBLICATIONS

Roussopoulos, N. and Kang H., "Principles and Techniques in the Design of ADMS+", Computer Magazine, vol. 189, No. 12, Dec. 1986, pp. 19–25.

Singhal, et al., "A Concurrency Control Algorithm and Its Performance For Replicated Database Systems", 6th International Conference on Distributed Computing Systems, Cambridge, MA, 5–86, pp. 140–147.

"Replicated Data in a Distributed Environment", Malcolm Colton, Sybase, Inc., IEEE, Jan. 1993.

*Primary Examiner*—Thomas G. Black
*Assistant Examiner*—Hosain T. Alam
*Attorney, Agent, or Firm*—Blakely, Sokoloff, Taylor & Zafman LLP

[57] ABSTRACT

The present invention provides the ability to replicate modifications made at a local site to multiple remote sites in a peer-to-peer environment. Information regarding these replicated modifications (e.g., insert, delete, or update) are contained in a set of replication tables. Thus, modifications can be duplicated at other sites immediately after the original modification, or deferred until the remote site is available. The replication tables of the present invention include a transactions table, transaction nodes table, calls table, call nodes table, and an exceptions table. The present invention further provides a logic-oriented procedure-level replication. Procedure-level replication modifies a remote site based on the logical operations used to modify the data at the originating site. Procedure-level replication provides the ability to identify conflicting updates as well. Information concerning conflicts identified by the present invention can be retained in the replication tables. The information contained in the replication tables can be used immediately, or subsequently, to address any conflicts detected by the present invention. The present invention provides the ability to rollback any modifications made once a conflict is identified. Further, the present invention provides the ability to address these conflicts within an application program. The present invention provides a row-oriented replication. A trigger associated with a table queues deferred remote procedures. The remote procedures use the old and new values from the original modification to replicate the modification at remote sites and detect conflicting updates.

47 Claims, 26 Drawing Sheets

U.S. PATENT DOCUMENTS

| | | | |
|---|---|---|---|
| 5,170,480 | 12/1992 | Mohan et al. | 395/608 |
| 5,261,094 | 11/1993 | Everson et al. | 395/608 |
| 5,276,871 | 1/1994 | Howarth | 395/607 |
| 5,280,612 | 1/1994 | Lorie et al. | 395/611 |
| 5,321,832 | 6/1994 | Tanaka et al. | 395/621 |
| 5,333,265 | 7/1994 | Orimo et al. | 395/610 |
| 5,423,037 | 6/1995 | Hvasshovd | 395/610 |
| 5,600,834 | 2/1997 | Howard | 395/617 |

```
┌─ 130
│  DATABASE B
│
│           INVENTORY
│     ITEM       QUANTITY ON HAND
│     WIDGET         350
│     NAILS          50
│     BROOM          10
│
│              ORDERS
│  ORDER SITE  CUSTOMER  ORDER ITEM  QUANTITY  FILLED
│     DB_B        11        WIDGET      40        F
└─
```

```
┌─ 120
│  DATABASE A
│
│           INVENTORY
│     ITEM       QUANTITY ON HAND
│     WIDGET         350
│     NAILS          50
│     BROOM          10
│
│              ORDERS
│  ORDER SITE  CUSTOMER  ORDER ITEM  QUANTITY  FILLED
│     DB_A        10        WIDGET      50        F
└─
```

BASIC ORDER TRANSACTION

1. PLACE ORDER:

A. INSERT ENTRY IN ORDERS TABLE WHERE:
       ORDERSITE = DATABASE SITE AT WHICH ORDER IS ENTERED (i.e., DB_A OR DB_B)
       CUSTOMER = CUSTOMER PLACING ORDER
       ORDER_ITEM = INVENTORY ITEM ORDERED
       QUANTITY = QUANTITY OF INVENTORY ITEM ORDERED
       ORDERSITE = DATABASE SITE AT WHICH ORDER IS ENTERED (i.e., DB_A OR DB_B)
       FILLED = "F", IF QOH > QUANTITY ORDERED, OR "B", OTHERWISE

2. INVENTORY_CHECK:

A. ACCESS QUANTITYONHAND (QOH) FROM INVENTORY TABLE;
   B. IF QOH > QUANTITY ORDERED, UPDATE QOH IN INVENTORY TABLE SUCH THAT QOH = QOH - QUANTITY ORDERED

3. COMMIT (i.e., MAKE CHANGES PERMANENT)

FIG. 2C

BEFORE REPLICATION

DATABASE A

INVENTORY

| ITEM | QUANTITY ON HAND |
|---|---|
| WIDGET | 350 |
| NAILS | 50 |
| BROOM | 10 |

ORDERS

| ORDER SITE | CUSTOMER | ORDER ITEM | QUANTITY | FILLED |
|---|---|---|---|---|
| DB_A | 10 | WIDGET | 50 | F |

DATABASE B

INVENTORY

| ITEM | QUANTITY ON HAND |
|---|---|
| WIDGET | 310 |
| NAILS | 50 |
| BROOM | 10 |

ORDERS

| ORDER SITE | CUSTOMER | ORDER ITEM | QUANTITY | FILLED |
|---|---|---|---|---|
| DB_B | 11 | WIDGET | 40 | F |

AFTER DBB => DBA REPLICATION

DATABASE A

INVENTORY

| ITEM | QUANTITY ON HAND |
|---|---|
| WIDGET | 310 |
| NAILS | 50 |
| BROOM | 10 |

ORDERS

| ORDER SITE | CUSTOMER | ORDER ITEM | QUANTITY | FILLED |
|---|---|---|---|---|
| DB_A | 10 | WIDGET | 50 | F |
| DB_B | 11 | WIDGET | 40 | F |

DATABASE B

INVENTORY

| ITEM | QUANTITY ON HAND |
|---|---|
| WIDGET | 360 |
| NAILS | 50 |
| BROOM | 10 |

ORDERS

| ORDER SITE | CUSTOMER | ORDER ITEM | QUANTITY | FILLED |
|---|---|---|---|---|
| DB_B | 11 | WIDGET | 40 | F |

FIG.2D1

| FIG.2D1 | FIG.2D2 |
|---|---|

FIG.2D

DATABASE A

INVENTORY

| ITEM | QUANTITY ON HAND |
|---|---|
| WIDGET | 310 |
| NAILS | 50 |
| BROOM | 10 |

ORDERS

| ORDER SITE | CUSTOMER | ORDER ITEM | QUANTITY | FILLED |
|---|---|---|---|---|
| DB_A | 10 | WIDGET | 50 | F |
| DB_B | 11 | WIDGET | 40 | F |

AFTER DBA => DBB REPLICATION

DATABASE B

INVENTORY

| ITEM | QUANTITY ON HAND |
|---|---|
| WIDGET | 310 |
| NAILS | 50 |
| BROOM | 10 |

ORDERS

| ORDER SITE | CUSTOMER | ORDER ITEM | QUANTITY | FILLED |
|---|---|---|---|---|
| DB_B | 11 | WIDGET | 40 | F |
| DB_A | 10 | WIDGET | 50 | F |

FIG. 2D2

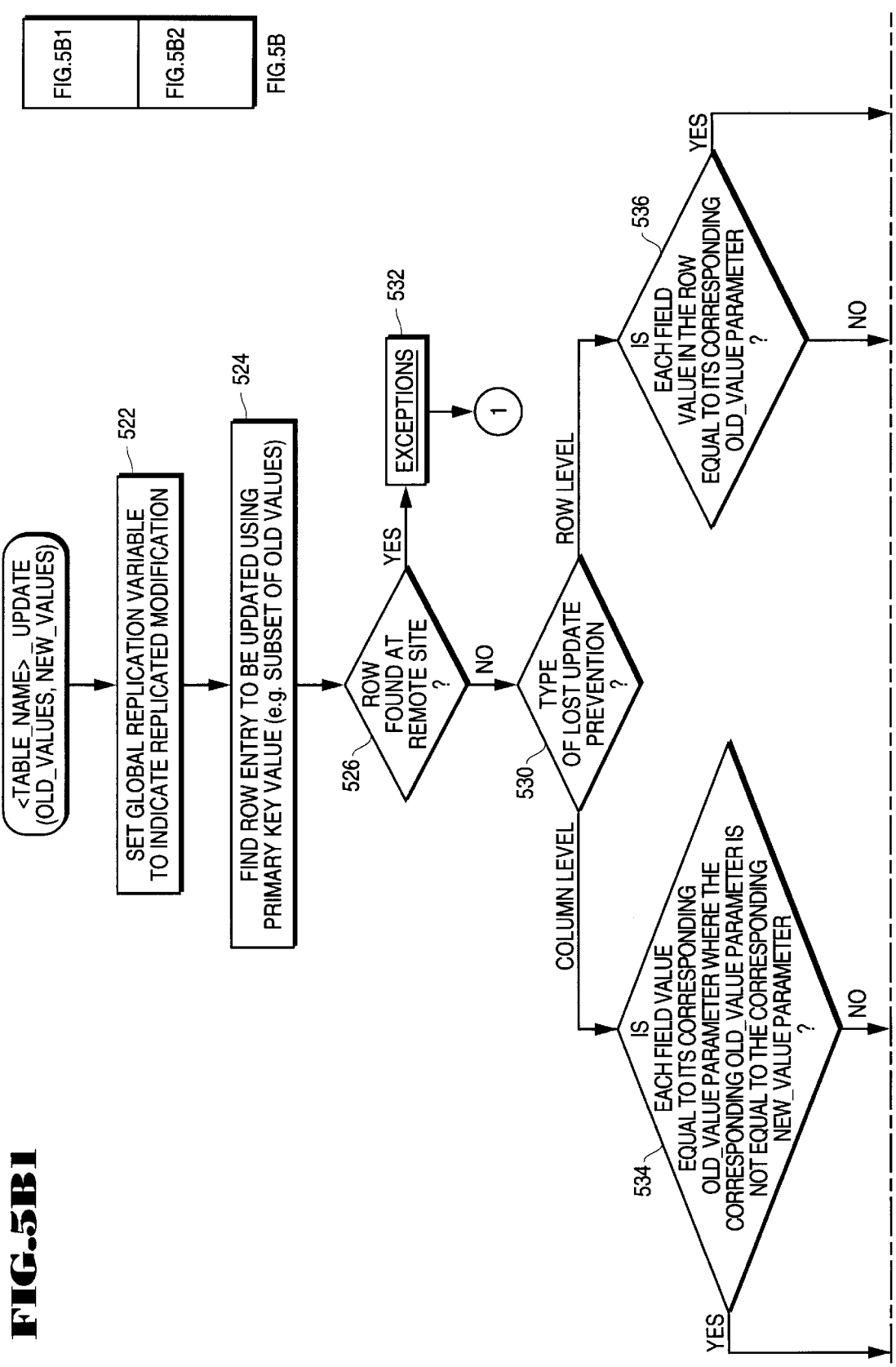

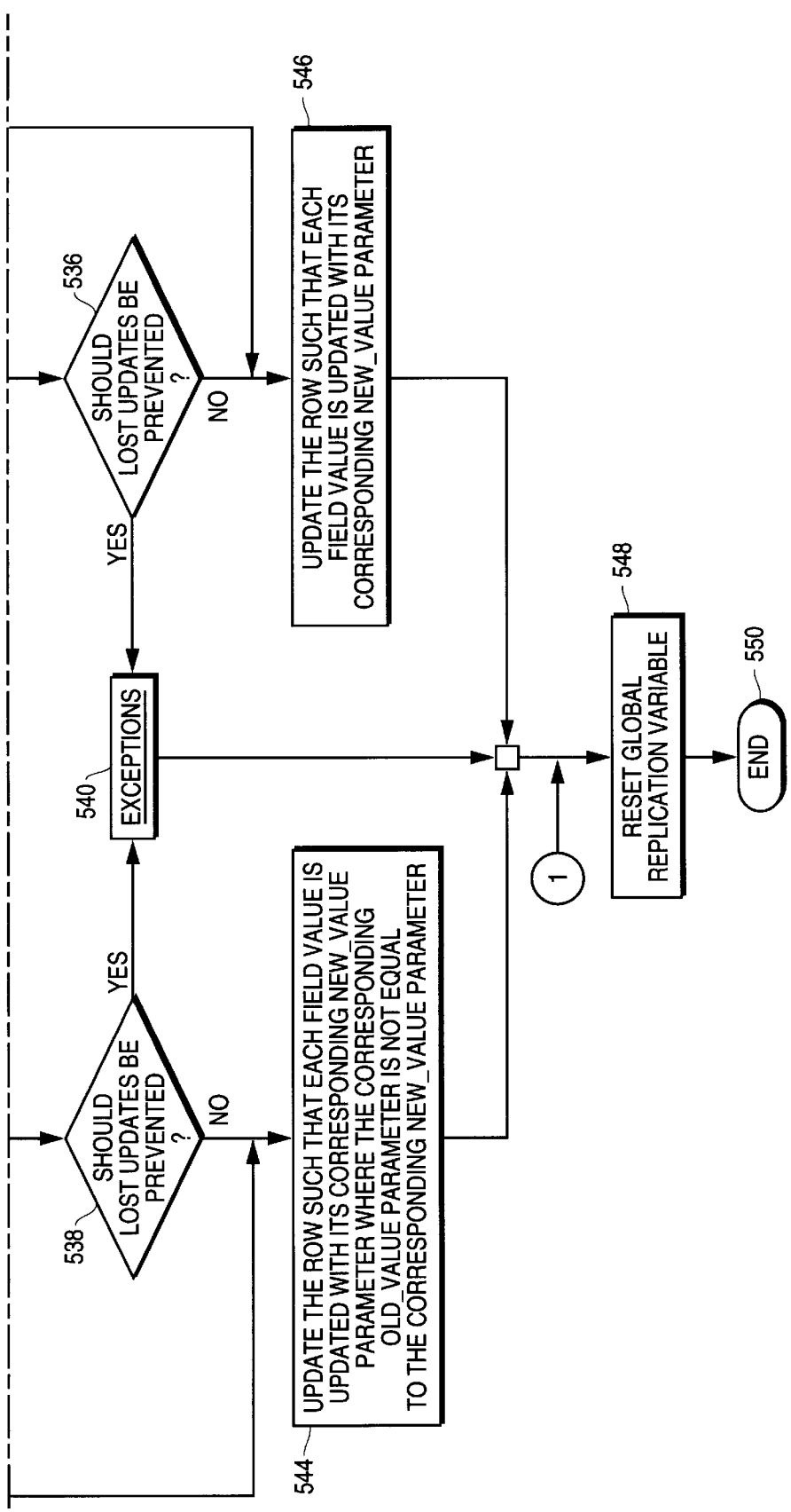
FIG.5B2

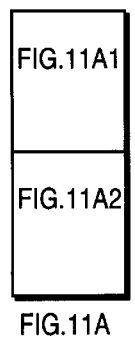
FIG.11A
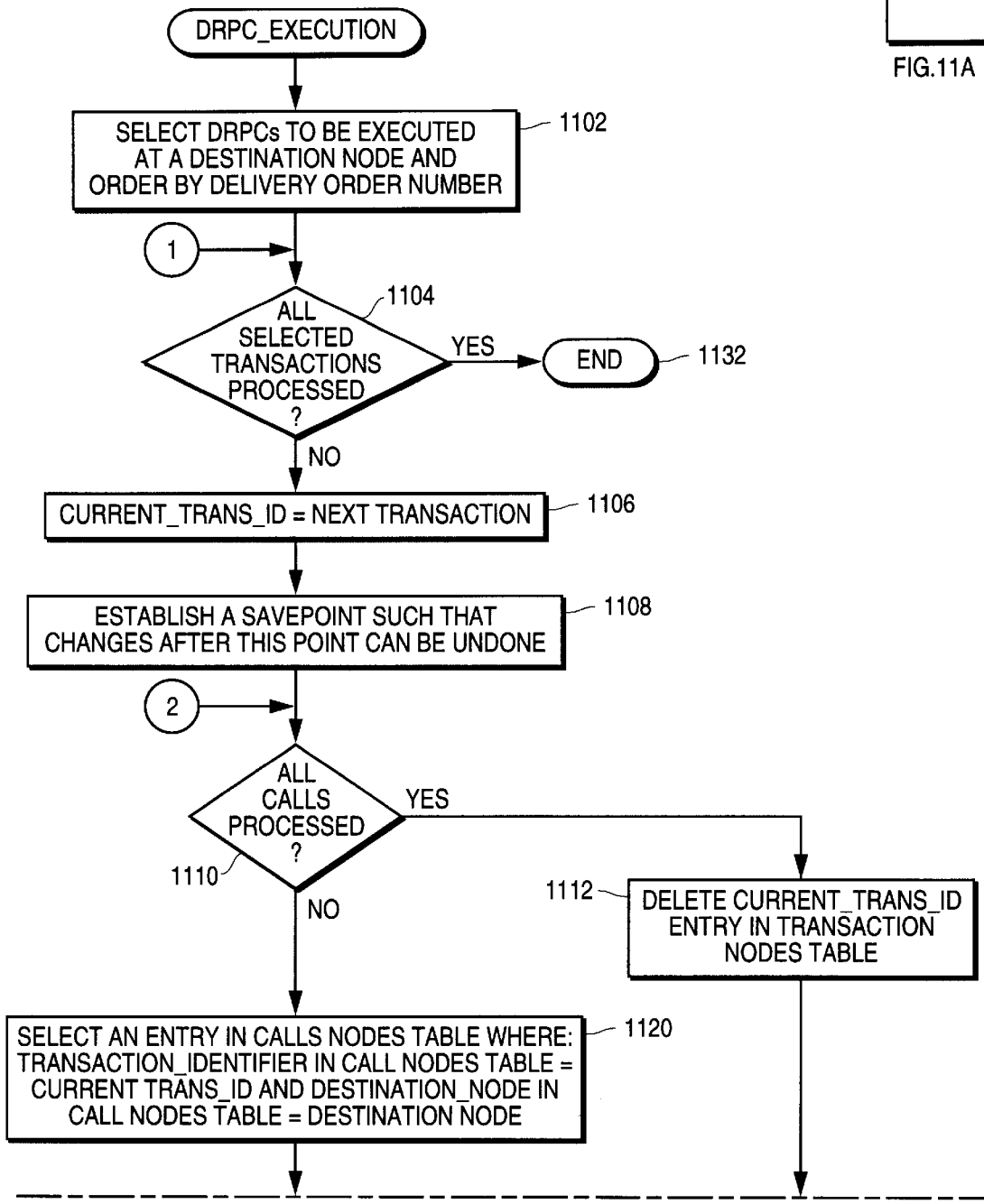
FIG.11A1

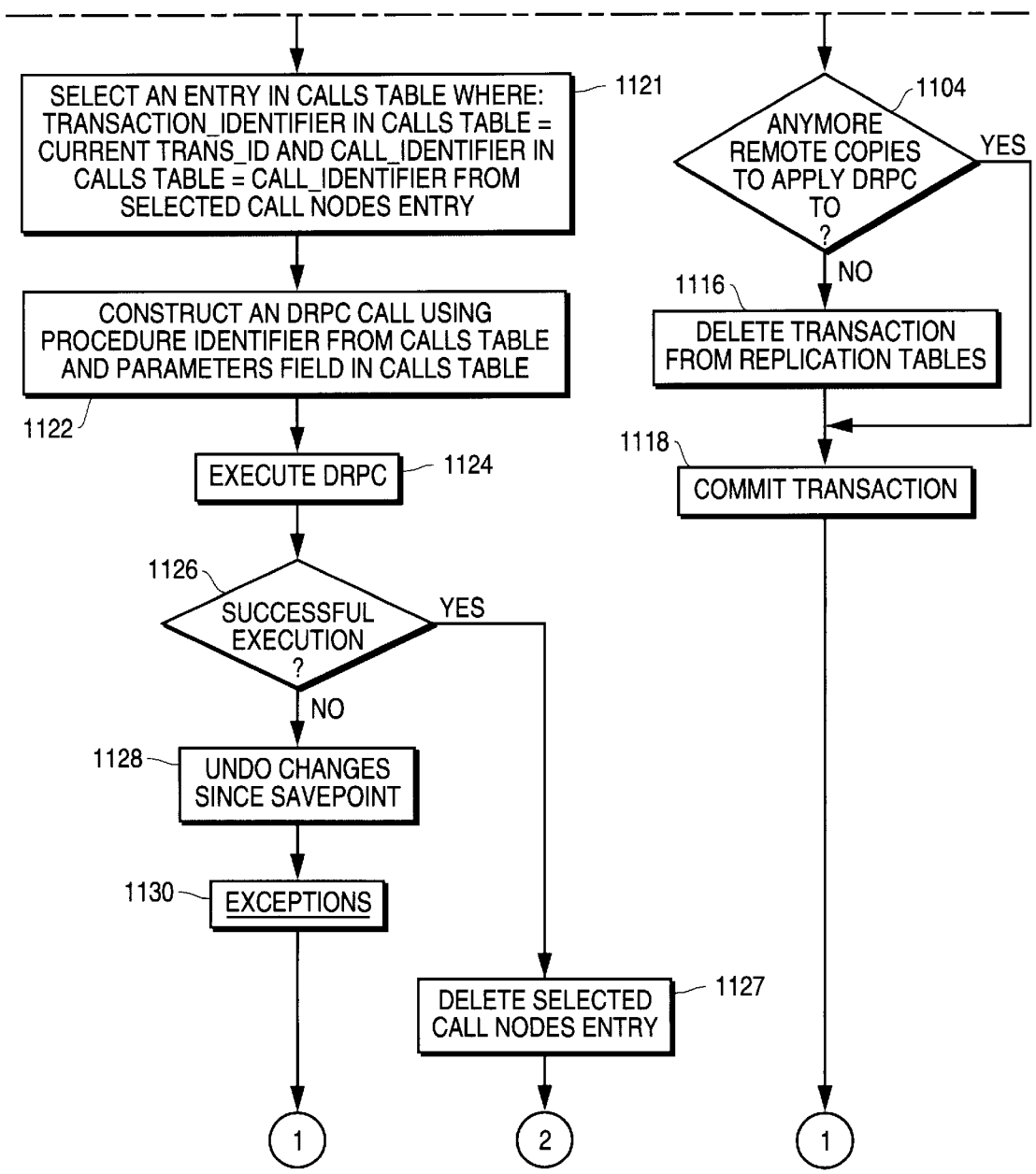
FIG. 11A2

METHOD AND APPARATUS FOR PEER-TO-PEER DATA REPLICATION

This is a continuation of application Ser. No. 08/479,075, filed Jun. 6, 1995, now abandoned, which is a continuation of application Ser. No. 08/126,586 filed Sep. 24, 1993 abandoned.

BACKGROUND OF THE INVENTION

1. FIELD OF THE INVENTION

This invention relates to the field of data replication.

2. BACKGROUND ART

Because of the ability of computerized systems at one location to communicate with other locations, computer applications are increasingly accessing data located on multiple, local and remote systems. In a read-only mode (i.e., no data modifications), multiple copies of the same data item can be located at multiple sites without raising any data integrity issues. However, as multiple users resident at multiple system locations begin to modify one or more of the copies of the same data items, data integrity becomes a critical issue.

Ideally, any user should be able to modify any copy of a data item with an ability to automatically propagate the modification to each copy of the same data item at any location. Prior art systems fall short of providing this type of peer-to-peer environment.

For example, some systems provide one "master" copy with multiple "slave" copies. Any modifications are performed on the "master," with the "slave" locations receiving a copy of the modified data after the modification is completed on the "master." Thus, a user at a "slave" location must access the "master" copy to modify a data item. This technique does not provide the ability to update any copy, and propagate the changes performed on that copy to all other copies.

For example, Cordi et al., U.S. Pat. No. 4,077,059, discloses a multi-processing system with a hierarchical memory having journaling and copyback. The hierarchical memory system has two memory units on each level. One main unit contains all of the data for the level, and the other unit, the copyback unit, contains the changes that have been made to that data either by addition or modification. The main unit interfaces with the next higher level in the hierarchy and its processing unit. The copyback unit transfers the data changes to the lower level when the lower level's main unit is not interfacing with its next higher level or processing unit. The copyback unit is smaller than the main unit to reduce the necessary storage units on each level. Since the copyback unit is smaller than the main unit, there is a possibility that the number of changes to the main unit's data may exceed the capacity of the copyback's store. A monitoring routine is used to assure that the number of changes did not exceed storage capacity of the copyback unit. Appropriate measures are taken to reduce the number of changes in the copyback store when the copyback store reaches capacity.

Schmidt et al., U.S. Pat. No. 4,558,413, discloses a management system for managing versions of software updated and stored in designated storage devices in a distributed software environment of a local area network. The system collects and recompiles versions of a software object (i.e., source and object modules) located on these storage devices in the LAN. The compiled program is used in the distributed software environment. The system includes the associated software object's: version, unique name, update chronology, dependencies on (and interconnections with) other software objects, and residence. The management system is automatically notified when changes are being made to a software object.

Haas et al., U.S. Pat. No. 4,631,673, discloses a method for refreshing multicolumn tables in a relational database. Haas provides a method for refreshing the snapshot (i.e., a read-only copy of a base table portion). Each record of a base table must have: (1) a tuple (i.e., unique) identifier, TID, (2) the previous records TID, PREVTID, and (3) "time stamp," UID, of the records last alteration. The snapshot contains the TID of the corresponding base table record. At refresh, the snapshot site sends the highest UID seen by the snapshot. The base table site identifies alterations based on TID, PREVTID, and UID values. Haas describes a master-slave environment whereby changes to a master are propagated to the replicas.

Kendall U.S. Pat. No. 4,635,189 describes a real-time distributed database management system that stores in a processor's memory copies of the variables needed to run the programs in that processor. When a variable is created, a processor is designated as the processor that determines the value of that variable. Each variable copy is updated by the current value of the original value on a periodic basis or upon the occurrence of a defined condition. Kendall describes a method of data manipulation such that a first processor can address an original variable in a second processor, and direct the most current value of that variable be stored in a third processor upon the occurrence of a condition in a fourth processor. An acknowledgment message can then be sent to a fifth processor.

Boyle U.S. Pat. No. 4,646,229, describes a database system that includes future versions of the database for use in time-oriented applications such as an application for scheduling the use of the same facilities to present and future users. All of the information required to represent the data base contents at desired future points in time is maintained in the data base. All transactions (e.g., logical units of work) are time stamped to assure access to the proper version of the database.

Gallant, U.S. Pat. No. 4,648,036, refers to a method for controlling query and update processing in a database system. Specifically, Gallant describes a method for ensuring that a query receives information representative of the database either before or after an update, but not information representative of a state after the update begins but before it completes. Transactional modifications are made to a future database structure. At the completion of the modifications, a switch is made from the present database structure to the future database structure. A query process accesses the present database structure.

Gladney et al., U.S. Pat. No. 4,714,992, refers to a method for managing obsolescence of replicas of data objects in a distributed processing system. Database objects at a source location are replicated at a replica location. As objects stored at the source location are altered, corresponding objects at the replica location become obsolete. A replica location generates a request for a list of obsolete objects from the source location. Gladney describes a means for identifying the obsolete objects, communicating the identify of the obsolete objects, and removing the obsolete objects from the replica location. Gladney describes a master-slave environment whereby changes to a master are propagated to the replicas.

Ecklund et al., U.S. Pat. No. 4,853,843, describes a multi-version database where each update operation creates a new version of the database, and the older versions remain available. Multiple alternative version paths are retained. Ecklund describes a method for deriving a minimal set of alternative version paths. When updates are applied to a partition they are performed synchronously on multiple sites in the partitions. Change list derived from the database histories and virtual partition change histories are used to determine the existence of conflicts. Ecklund describes a system for merging multiple versions of a data object into a distributed database such that each updating partition can access its own version.

Carey et al., U.S. Pat. No. 4,875,159, describes a system for synchronizing two versions of files in a multiprocessor system. Both versions contain a sync-complete control field and a sync-in-progress field. The sync-complete field indicates that the associated version is synchronized when it is set. The sync-in-progress field indicates that the associated version is in the process of being synchronized when it is set. If the sync-complete field is cleared in one or both of the versions, the sync-in-process is set in one of the versions. Then, a temporary file is created, and a copy of the one version is transferred to the temporary filed. The sync-in-progress field of the one version is examined after the transfer is complete. If the sync-in-progress field is set, the sync-complete field is set in the temporary version. The temporary version is renamed to the other of the versions and the original of this version is removed.

Boykin et al., EPO 0,428, 264 A2, discloses a method for generating an access plan, in a database system, containing low-level code for performing preselected constraint checks. Database access commands are compiled into access plans that are executed at runtime instead of the access commands to improve system performance.

Roussopoulos, N. and Kang, H., "Principles and Techniques in the Design of ADMS±," IEEE, December 1986, pp. 19–25 describes a technique for downloading database objects from a mainframe to a workstation as the workstation accesses data on the mainframe. Access to the localized database subset are performed at the workstation. Database objects accessed by multiple workstations are globalized. Updates at the mainframe are logged and incrementally applied before a query of the involved data is performed. Modifications to the downloaded objects are performed by maintaining a backlog consisting of entries each of which consists of an operation (i.e., insert or delete), tuple-id, and DI-log (i.e., either a pointer to a file containing deletes, or a pointer to a newly inserted tuple).

SUMMARY OF THE INVENTION

The present invention provides the ability to replicate modifications (e.g., insert, delete, or update) made at a local site to multiple remote sites in a peer-to-peer environment. Information regarding these modifications are contained in a set of replication tables. Thus, modifications can be duplicated, asynchronously, at other sites immediately after the original transaction's modifying commitment, or deferred until the remote site is available.

The replication tables of the present invention include a transactions table, transaction nodes table, calls table, call nodes table, and an exceptions table. The transactions table contains information about a transaction. The transaction nodes table contains an entry for each remote site at which a transaction is to be applied. The calls table contains an entry for each procedure (i.e., transactional or non-transactional series of logical steps) to be replicated at remote sites. The call nodes table identifies nodes at which a procedure is executed. The exceptions table contains information regarding an exception raised when processing a replicated procedure at a data site (e.g., conflict or informational message).

The present invention provides a value-oriented row level and column level replication. Row-level replication modifies a remote site based on the old and new values contained in a row at an originating site. Column-level replication modifies a remote site based on the column values at an originating site. Further, row-level and column-level replication provides the ability to identify conflicting modifications at the remote site. A trigger (i.e., a procedure) is executed each time a modification is made to a data item. A trigger queues entries in the replication tables. The table entries retain information such that the original modification(s) associated with a data item can be propagated to remote copies of the same data items. The new values can be compared to the values contained in the remote copies to identify any modifications that could be lost, if the current modification is applied.

The present invention further provides a logic-oriented procedure-level replication. Procedure-level replication modifies a remote site based on the logical operations used to modify data at the originating site. Procedure-level replication provides the ability to identify conflicting updates as well. Thus, the same logical operations performed on one copy of a data item can be propagated to all other copies of the same data item.

Information concerning conflicts identified by the present invention can be retained in the replication tables. The information contained in the replication tables can be used immediately, or subsequently, to address any conflicts detected by the present invention. Procedure-level replication provides the ability to address conflicts, and other exceptions, within the procedure replicated to, and executed at, the remote data locations. The present invention further provides the ability to rollback any modifications made when a conflict is identified.

BRIEF DESCRIPTION OF THE DRAWINGS

FIGS. 2B and 2C illustrate an order transaction and sample data updated by the order transaction.

FIG. 2D illustrates a replication of the transactions processed at multiple data locations.

FIG. 5A–5C illustrates a process flow for modification operations on local and remote copies of data items.

FIGS. 11A–11B illustrate the execution of transactional and non-transactional deferred remote procedure calls.

DETAILED DESCRIPTION OF THE INVENTION

A method and apparatus for data replication is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
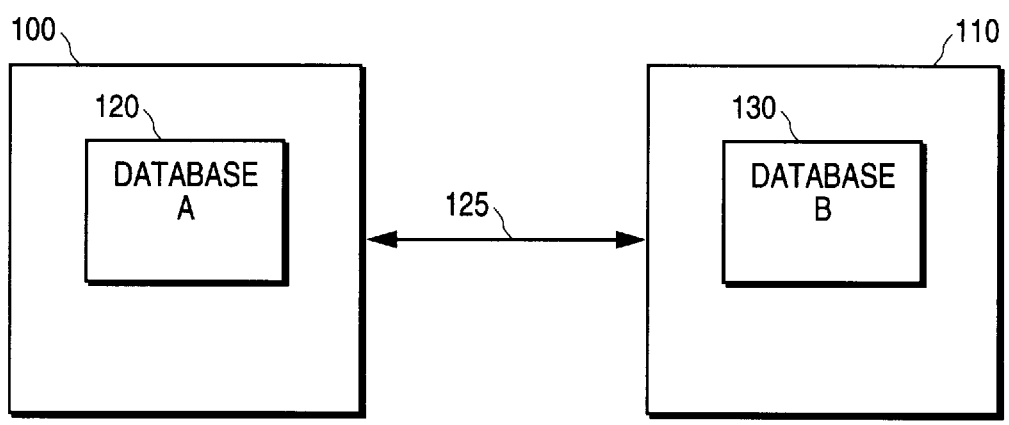
FIG. 1 illustrates one or more computerized systems at one or more locations each containing copies of data items.

In a networked environment consisting of one or more locations (e.g., database servers or computer sites), duplicate copies of the same data may be resident at more than one location (e.g., one or more database servers or computer systems). FIG. 1 provides an example of a networked environment containing copies data resident at multiple sites. Data site A 100 may be any type of computerized system (e.g., networked database server, mainframe system, or personal computer system). Similarly, data site B 110 can be any type of computerized system. Data site A 100 contains databaseA 120. Data site A 100 and data site B 110 are interconnected via communication link 125.

Initially, databaseB 130, located at data site B 110, contains a duplicate copy of databaseA 120. Thus, a copy of the same data item is available at both sites. That is, a user that accesses databaseA can read a data item (e.g., number of brooms in inventory) at data site A 100 while another user may access the number of brooms on hand by reading information resident at data site B 110. As long as user A and B access the quantity on hand data item in read-only mode, the value of this data item at both locations will remain constant and, therefore, consistent.

Figure 2A:
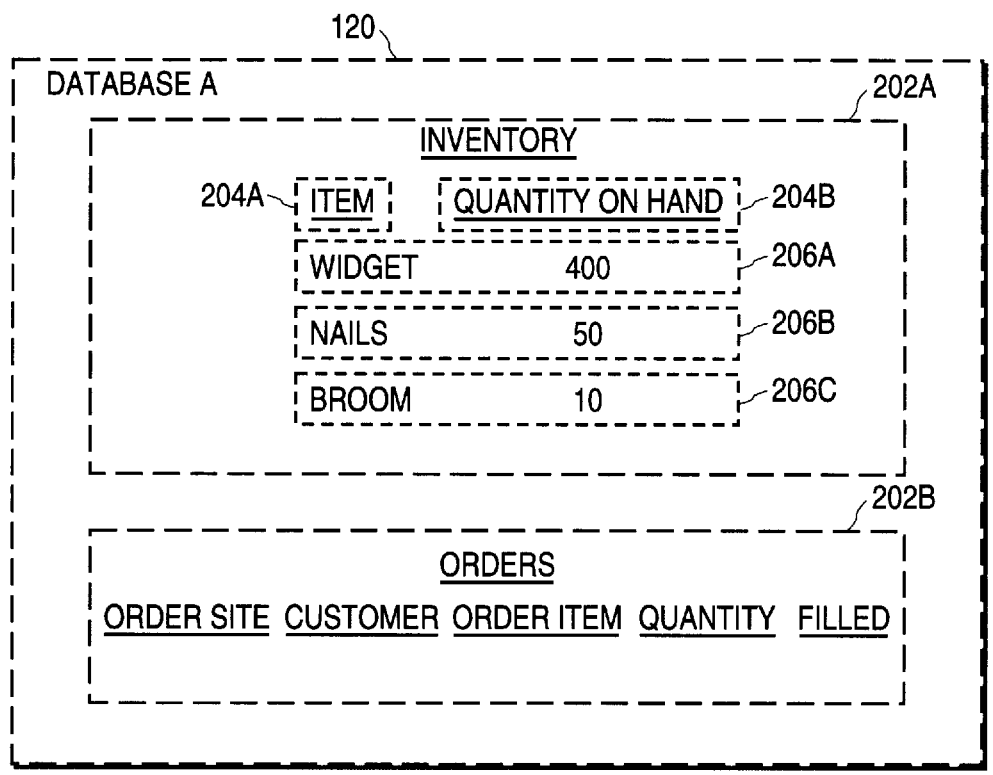
FIG. 2A illustrates the structure of the data items stored at one location.

FIG. 2A further illustrates databaseA 120. Database A 120 contains two relations, or tables. The inventory table 202A contains two fields: Item 204A and QuantityOnHand (qoh) 204B. The item and qoh fields comprise the information for each inventory item contained in inventory table 202A. The orders table 202B contains order information associated with a customer's order (e.g., originating location, customer placing the order, item ordered, quantity of item ordered, and whether the order can be filled by stock on hand). Each table contains entries, or rows. For example, inventory table 202A contains three entries 206A–206C.

Figure 2B:
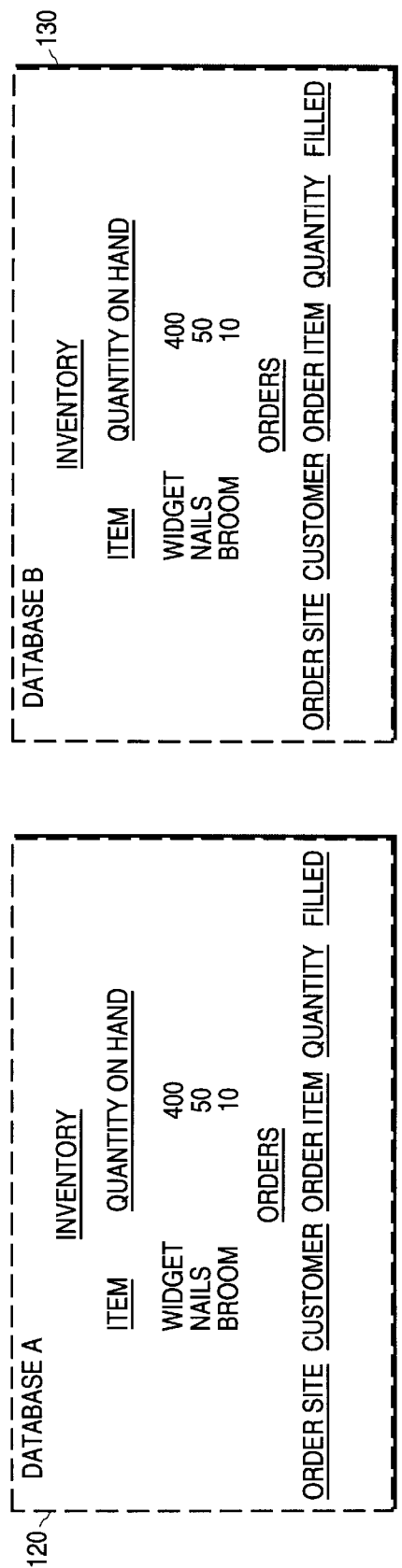

Referring to FIG. 2B, DatabaseB 130, like DatabaseA, contains an inventory and orders tables. Further, DatabaseA and DatabaseB contain identical entries and values for each entry. FIG. 2B further provides a set of steps that can be used to modify the data contained in either DatabaseA or DatabaseB.

This set of steps, a typical order transaction (i.e., order placement) consists of steps for checking the qoh to determine the amount of the ordered item in stock, updating the qoh in the inventory table (i.e., where qoh>quantity ordered), and inserting an entry in the orders table to reflect the order. This process is reflected in steps one and two of the basic order transaction provided in FIG. 2B.

The final step in the basic order transaction, the commit step is an implicit step in transaction processing. It provides the ability to make any changes that have been made to the tables permanent. Prior to executing a commit (i.e., makes the table changes permanent), the changes made to the inventory and orders tables can be rolled back.

FIG. 2B illustrates the initial state of the tables in the two databases. However, users A and B can update the tables using the basic order transaction. That is, when user A receives an order from a customer (e.g., customer 10 orders fifty widgets) and invokes the order transaction at location A (i.e., databaseA), the order transaction will update the inventory and orders tables in DatabaseA. DatabaseB will remain unchanged. Thus, after user A's order processing transaction, DatabaseB will no longer be identical to DatabaseA.

FIG. 2C illustrates the resulting databases after both user A and B use the order transaction to process an order received at their respective sites. For example, user A receives an order for fifty widgets from customer 10. User A invokes the order transaction. The order transaction updates the inventory table (i.e., the qoh field associated with the widget inventory item) and the orders table (i.e., adds an entry to reflect the order) in database A. Similarly, user B invokes the order transaction to process the order received from customer 11 at site B (i.e., for forty widgets). The transaction invoked by B updates the inventory table and orders table in database B.

Both orders consisted of an order for widgets. Customer 10's order was for fifty widgets, and Customer 11's order was for forty widgets. Therefore, a total of ninety widgets were sold. However, database A does not reflect customer 11's order, and database B does not reflect customer 10's order. Thus, each database only reflects the orders processed by one of the users (i.e., A or B), and will therefore not reflect all of the orders that have been processed at all of the sites.

Thus, there is a need to propagate local modification to all remote copies of the same data item. The present invention provides this ability to replicate the data modifications made at one location to other locations. Thus, the databases illustrated in FIG. 2C are be replicated to other sites such that order transaction modifications at one site are be applied to other sites, and the data items are again consistent.

FIG. 2D illustrates the state of the two databases before and after the replication capabilities of the present invention are used. Before replication, the two databases reflect only the order transactions processed locally (i.e., database A reflects user A's order transaction, and database B reflects user B's order transaction), and not the order transactions processed on a remote database (e.g., database B is a remote database to user A).

After the DbB=>DbA and DbA=>DbB replications, user A's data modifications are reflected at user A's local database (i.e., database A) and at database B (i.e., remote site). Similarly, user B's data modifications are reflected at both the local and remote sites. The widget's qoh value in both of the databases reflects the overall decrease in the qoh associated with both of the orders. Further, the orders tables in both databases reflect both of the orders received.

The present invention provides the ability to replicate data at the row level and at the procedure level. Row level replication (i.e., value-oriented replication) is accomplished by associating a trigger with a table (e.g., inventory table). A trigger is a procedure that is executed when a modification (e.g., update, insert or delete) occurs to a row in a table. A trigger identifies a deferred remote procedure call (DRPC) that has as its arguments the old values, new values, and the operation (e.g., insert, delete, or update).

Procedure-level replication propagates the operation rather than the row values (i.e., logic-oriented). After a procedure is executed at the originating site, the procedure defers a call to itself at another site. The DRPC will apply the logical update of the original procedure at a remote site. Procedure-level replication requires less network traffic than row-level replication since one DRPC can be used for multiple tables.

Modification. Identification and Retention

To propagate the modifications made to data items in one database to the same data items in another database, it is necessary to retain the modifications until they can be made to the other sites. Prior art methods use a transactional recovery log (i.e., redo log) to retain and identify the database modifications for propagation. However, the redo log was originally intended for the application of transactions in a single database system, and contains "undo" information (i.e., information that can be used to roll back changes made to data after an event, such as a system failure, occurs).

For example, a redo log can be used on a single copy of the data to undo changes made to a database by one or more transactions when a system or application error is encountered. When such an error is encountered, the transactional updates made prior to the error (and related in some way to the error), must be undone to maintain the data integrity in existence prior to the updates. However, the redo log was not designed for capturing modification information for propagation to a second database system. Thus, when the log is used for its intended purpose as well as a resource for data replication, a storage management problem arises, because a redo log that it used to retain propagation information can never be moved off-line (i.e., made inaccessible to the database system).

Unlike the prior art systems, the present invention provides a propagation identification capability that can be managed in the same way as any other table, or relation, managed by a database administrator. The present invention provides the ability to encode the propagation information in tables in the database system. The information stored in these tables can be retrieved as any other data within the database system, and can be accessed at any time.

Figure 3:
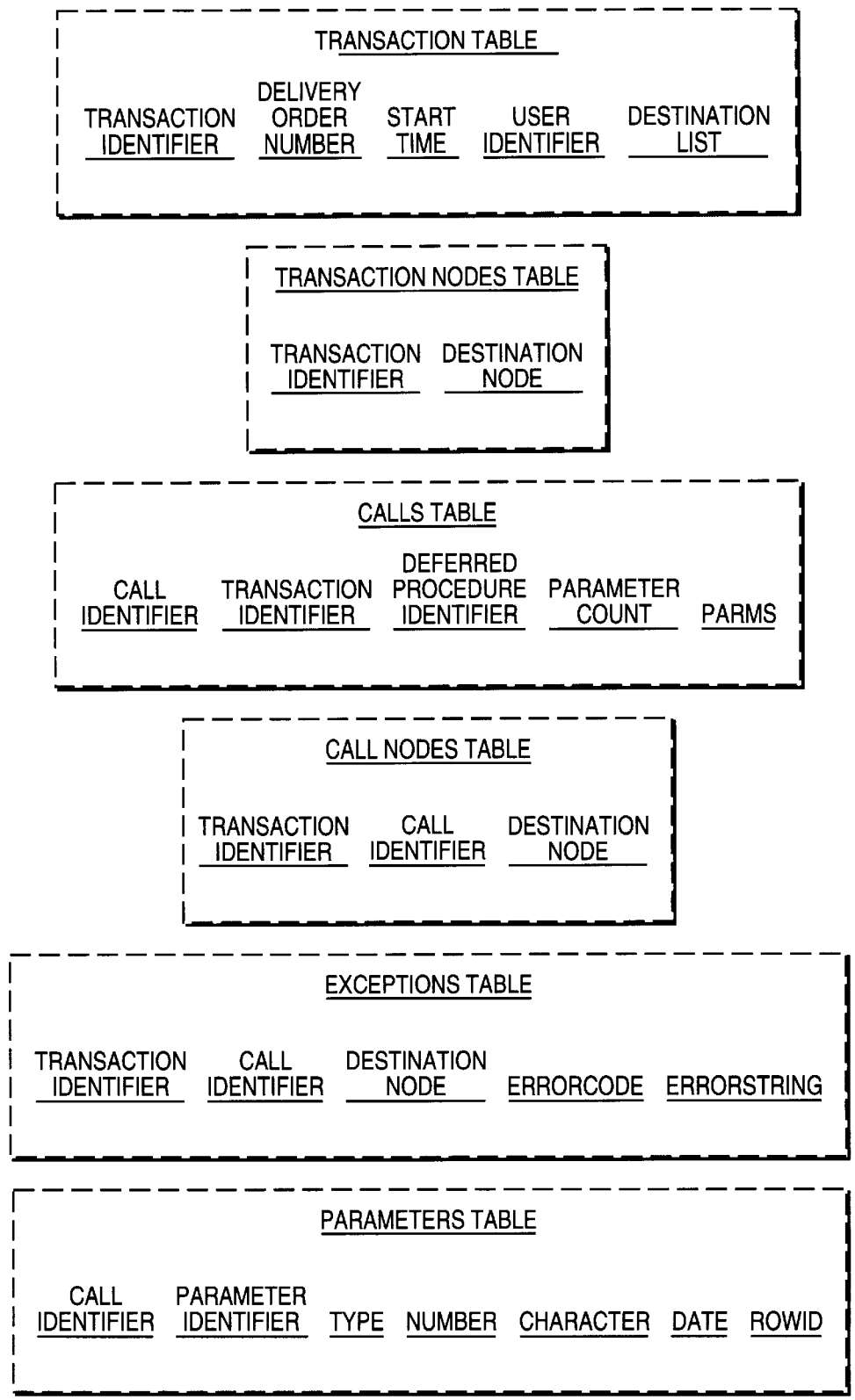
FIG. 3 illustrates replication tables.

The tables include the information necessary to replicate a data modification to other data sites. For example, the tables contain information relative to a DRPC, its replication destination, the transaction the DRPC is a part of, the order in which a DRPC is executed within a deferring transaction, the order in which transactions are executed relative to other transactions, and the arguments used by each DRPC. The present invention uses the following tables: Transactions, Transaction Nodes, Calls, Call-nodes, and Exceptions. FIG. 3 illustrates a composition of these tables. Because of the versatility of the present invention (e.g., replication information is stored in relations), additional information can be added to these relations.

Transactions Table

The Transaction Table contains information about transactions that are performed on the data and that use deferred remote procedure calls (i.e., DRPCs) in some manner. The transactions table consists of the following fields: transaction identifier, delivery order number (DON), start time, deferring user identifier, and destination-list. The Transaction identifier ("Transaction_Id") is a unique identifier that is assigned to each transaction. The Transaction_Id further uniquely identifies the origin database for deferred transactions. Transaction_Id is the primary key for the Transaction table (i.e., the value that uniquely identifies an entry in this relation). The destination-list controls whether destinations for a transaction are described by the call-nodes table or external routing tables.

The DON is an abstraction of a system change number. A DON reflects the commit sequence of a transaction relative to all of the other transactions listed in the transaction table. The DON respects the partial order of the commit of the transactions in the deferring database. Thus, if transaction one T1 touches the same data as transaction two T2 and T2 commits before T1, the DON of transaction two (D2) is less than T1's DON (D1).

The time field reflects the time that the transaction was started, and the deferring user field identifies the user who initiated the deferred transaction's procedure call. This information can be used to monitor and control access (i.e., for security reasons). For example, prior to making any modifications to data at a remote site, a check can be made to determine whether the deferring user has the access privileges that would enable the modification at the remote site.

The replication capability provided by the present provides the ability to modify all or some portion of the data modified by a transaction by site specification. That is, a deferred transaction can consist of a subset of the calls deferred by the original transaction for any given destination site. For example, an order transaction at site A can update an orders and inventory tables, and the replicated transaction at site B can update the orders table only.

A call nodes table can be used to define a transaction's calls that are applied at a given site. In addition, any routing mechanism can be used. For example, a mapping of calls to destinations can be defined according to the name of the procedures beings deferred. The destination list field of the transactions tables indicates the mapping mechanism (e.g., call nodes table or other routing mechanism) used.

Transaction Nodes Table

The Transaction Nodes Table (i.e., destinations table) identifies the nodes or remote sites at which the transactions contained in the transactions table are to be executed. The transaction node table contains one entry for each node (i.e., remote site) at which a transaction is to be executed.

The transaction identifier ("Transaction_Id") has the same definition as the same field in the transactions table. The Destination Node ("dest_node") identifies the nodes (i.e., remote databases) at which the transaction is to be executed to replicate the changes made by the transaction on the local data site. Thus, the same transaction_id can be used to access an entry in the transaction table, and any corresponding entry or entries in the transaction node table. Further, an entry in the transaction nodes table identifies one of the remote sites to which the transaction's modification are to be propagated. A transaction_id and dest_node combination can uniquely identifies an entry in the transaction nodes table.

Calls Table

As illustrated in the order processing example provided earlier, transactions (i.e., a logical unit of work) can be composed of steps, or procedures (e.g., place order and inventory check). In software encoding these steps, each can be considered a separate procedure to provide additional structure to an application. Further, procedures can be defined without being a part of a transaction. Information regarding either type of procedure is retained in the calls table. The calls table contains a unique identifier, Call Identifier ("call_id"), that can order a call within a transaction, or orders non-transactional DRPCs relative to all others.

Like the transactions and transaction nodes tables, the calls table contains a transaction_id. For transactional DRPCs, the transaction_id has the same definition as the transaction_id field in the transactions and transaction nodes tables. For non-transactional DRPCs, the transaction_id field is not used.

The Deferred Procedure Identifier ("proc_id") identifies the procedure, or call, (i.e., series of program steps) that is to be executed at the remote site. For example, the proc_id may be a character string containing the procedure's name. It could also be a system-provided, unique identifier that includes the location (e.g., storage address) of the procedure. The parameter count identifies the number of parameters (values passed into the procedure for use during the execution of the procedure) for a procedure.

The parameters field (parms) is a long raw byte string containing the parameters for the entry in the calls table. The format of the field is as follows:

$$<tc_1><len_1><value_1><tc_2><len_2><value_2>\ldots$$
$$<tc_n><len_n><value_n><0>$$

Where:
$<tc_i>$ is the parameter type code for the ith parameter (i.e., whether the parameter is of type number, character, date, rowid, or null);
$<len_i>$ is the two byte binary integer value of the length of $value_i$ (length of zero indicates a null parameter value);
$<value_i>$ is the parameter value;
$<0>$ is a single byte value indicating the end of the string.

Call-Nodes Table

The call-nodes table contains a row for every destination of each deferred call when the destination is not defined by an external routing table. The call-nodes facilitates the ability to replicate a transaction comprised of multiple procedure calls by specifying the execution of some or all of the calls at a given site. When a call's destinations are not defined by an external routing structure, call nodes are specified by the deferring user, either with the deferred call, as transaction default destinations, or as system determined destinations. When a deferred transaction is being sent to a destination, the call-nodes table is queried to select those calls that are to be executed as part of the deferred transaction at the destination.

The Transaction Identifier and the call identifier are the same as those in the calls table. The destination node field identifies the node at which the execution of a procedure is deferred.

Parameters Table

In an alternate embodiment, a table can be used to retain the parameters for a call instead of storing the parameters in the calls table. In this embodiment, the parameters table contains an entry for each parameter used by an entry in the calls table. That is, for each call containing parameters, there is one or more entries in the parameters table. Each entry in the parameters table contains a parameter for an entry in the calls table.

The parameters table contains a Call Identifier ("call_id"). Like the calls table, the call-id identifies a procedure call. A procedure call with more than one parameter contains an ordered list of parameters. The Parameter Number ("param_no") can, therefore, identify an entry's location within a procedure call's ordered list of parameters. A call_id and param_no pair can uniquely identify an entry in the parameters table. The type field contains a code that indicates the type of parameter. That is, the type field indicates whether the parameter table entry is a number, character, date, rowid.

Only one of the remaining fields (i.e., Number, Character, Data, Rowid) is used for each entry in the table. That is, if the parameter is a number, the value of the parameter is stored in the number field. Similarly, if the parameter is of type character, the value of the parameter is stored in the character field. A date parameter value is stored in the date field. Rowid information (i.e., identifier specifying a row within a table) is stored in the rowid field.

Exceptions Table

The exceptions table is used to store information related to any exceptional or occurrence during executions of a deferred transaction. This information can be subsequently reviewed, and the exceptional occurrence can be addressed. For example, multiple conflicting updates may occur to different copies of replicated data. Thus, one transaction, T1, can update one copy of record A, C1, and a second transaction, T2, can update a second copy of record A, C2. If T1 is propagated to C2, T1 can overwrite T2's update, and vice versa. The present invention detects this type of exception, and others, and retains information for each exception.

The exceptions table contains a Transaction Identifier ("transaction_id") field that has the same definition as the transaction_id field in the transactions, transaction nodes, and calls tables. The call identifier has the same definition as the call_id field in the calls table. The Destination Node ("dest_node") identifies the node at which the exception occurred. In the previous paragraph's example, the node field would contain the identification of the node that stores C2. The error code field (error_code) contains a code to identify the error, or exception, encountered (e.g., overwrite potential for T2's update of C2). Further, the error string field contains an additional description of the error. A transaction_id, and dest_node combination can uniquely identify an entry in this table.

Populating Replication Tables

The modification replication provided by the present invention is asynchronous. That is, the replication procedures that modify the remote data copies (e.g., <table_name>_insert) do not execute as part of the modification operation that is performed at the local, originating site. Rather, a modification to the remote data copies can be deferred until the remote copies are available.

The process of deferring the modification operation at the remote site is accomplished, in the present invention, by storing the information for each deferred modification operation in the replication tables, and subsequently performing the modification operation identified in the replication tables at the remote sites.

Referring to DatabaseA (DbA) in FIG. 2C, for example, the modifications to the Inventory and Orders tables can be replicated to DatabaseB (DbB) in FIG. 2C by replicating DbA's modification to DbB's Inventory and Orders tables. Thus, the update performed on DbA's inventory table and the entry inserted in DbA's orders table can be replicated at the DbB site by replicating the Basic Order Transaction's modifications performed on the data in DbA.

Figure 6:
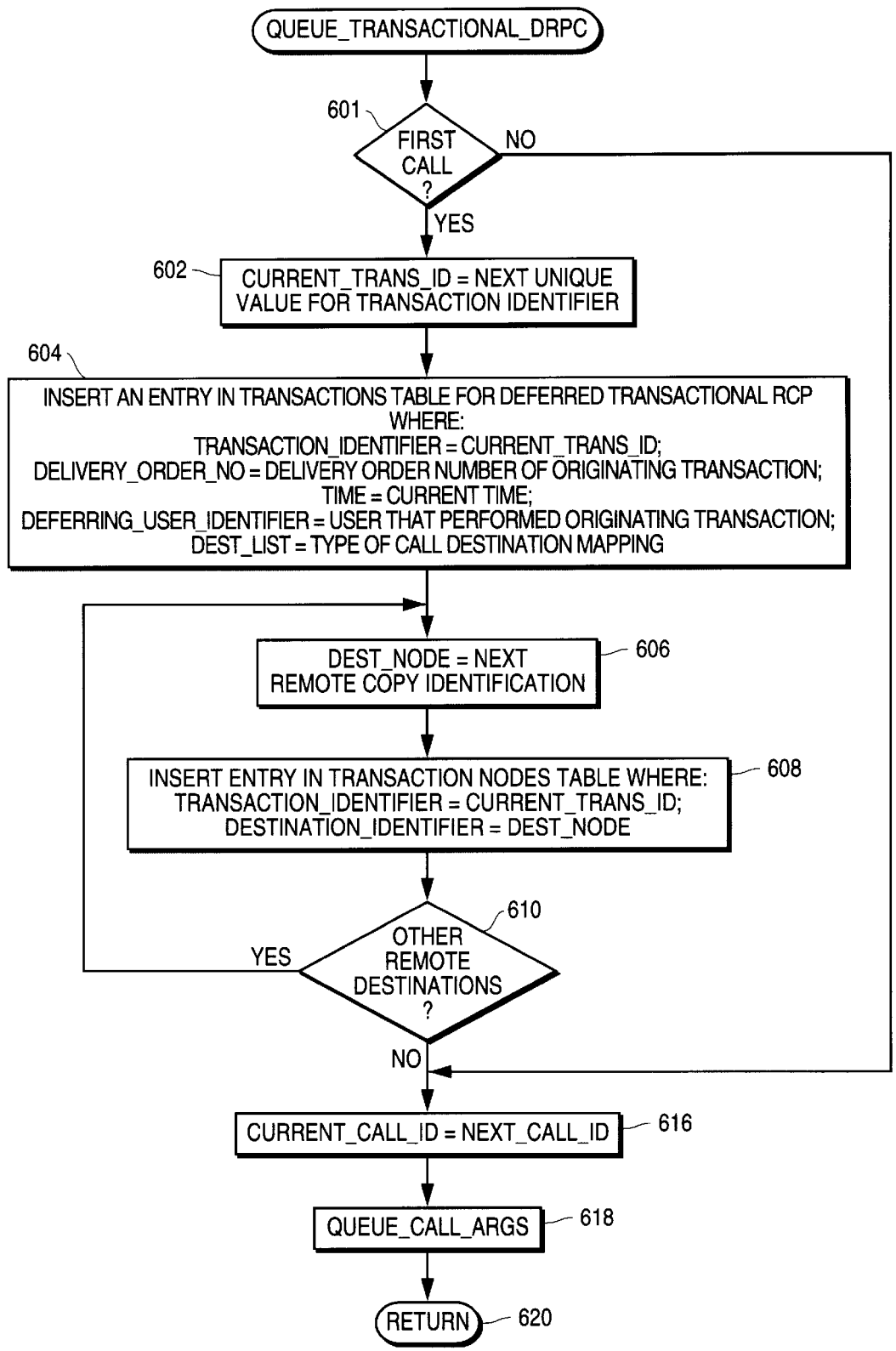
FIGS. 6 and 7 illustrate a technique for entering replication information in the replication tables.

The basic order transaction is replicated at DbB by queuing the transaction in the replication tables, and subsequently applying the modifications contained in the transaction on the data in DbB according to the information contained in the replication tables. FIG. 6 illustrates a processing flow for queuing the transaction, transaction nodes, and call destination tables for a transaction, a transaction's destination nodes, and any transactional or non-transactional call. FIG. 6 can be invoked multiple times to queue any number of calls. For example, the invoking routine can contain a looping mechanism that can invoke queue_transactional_DRPC for each transactional or non-transactional call.

At decision block 601 (i.e., "first call?", if this is not the first call to queue this transaction, processing continues at block 616. If it is the first call, processing continues at block 602. At processing block 602, a current transaction identifier is assigned to the transaction to be stored in the tables (e.g., DbA's basic order transaction). The current transaction identifier is assigned a value that will uniquely identify the table entry. At processing block 604, an entry is inserted in the transactions table. The transaction identifier field is assigned the value of the current transaction identifier.

The originating transaction (e.g., DbA's order transaction) is assigned a DON when the commit step in the order transaction is successfully performed. The DON provides an ability to order transactions based on the order in which they have modified the data. Thus, where the order of the modifications is crucial, the DON can be used to retain the modification order and thereby maintain data integrity. The DON field is assigned the value of the original transaction's DON. The time field of the new transactions table entry is set to the current time. The deferring user identifier is assigned the value of the user that originated the original transaction.

A destination (i.e., remote data copy identifier) is identified at processing block 606. At processing block 608, an entry in the transaction nodes table is created to indicate that the transaction currently being entered into the replication table is to be performed at the identified destination. Thus, the transaction identifier is assigned the same value as the same field in the transactions table, and the destination node is set to the identified destination.

An entry should be made for each destination identified. Thus, at decision block 610 (i.e., "other remote destinations?"), if additional destinations exist, processing continues at processing block 606 to identify the next destination. Further, a transactions node table entry is created for each such destination. When it is determined, at decision block 610 (i.e., "other remote destinations?"), that all of the remote destinations have been entered into the transactions node table, processing continues at decision block 616 (i.e. "all calls in transaction processed?")

As illustrated in the basic order transaction provided in FIG. 2B, a transaction can be comprised of multiple steps. In the basic order transaction, the steps where: check inventory and process order. These steps can be designed and encoded in software as separate procedures. In this case, the basic order transaction can contain an inventory_check procedure that exercises the steps contained in an inventory check. Similarly, the basic order transaction can contain the place_order and commit procedures. Each of these calls that comprise the transaction can then be entered into the calls table of the present invention.

At processing block 616, a unique call identifier is generated and assigned to current_call_id. At processing block 618, Queue_call_args is invoked to enter the call information into the replication tables. After the appropriate call information has been added to the replication tables, processing returns at block 620.

Figure 7A:
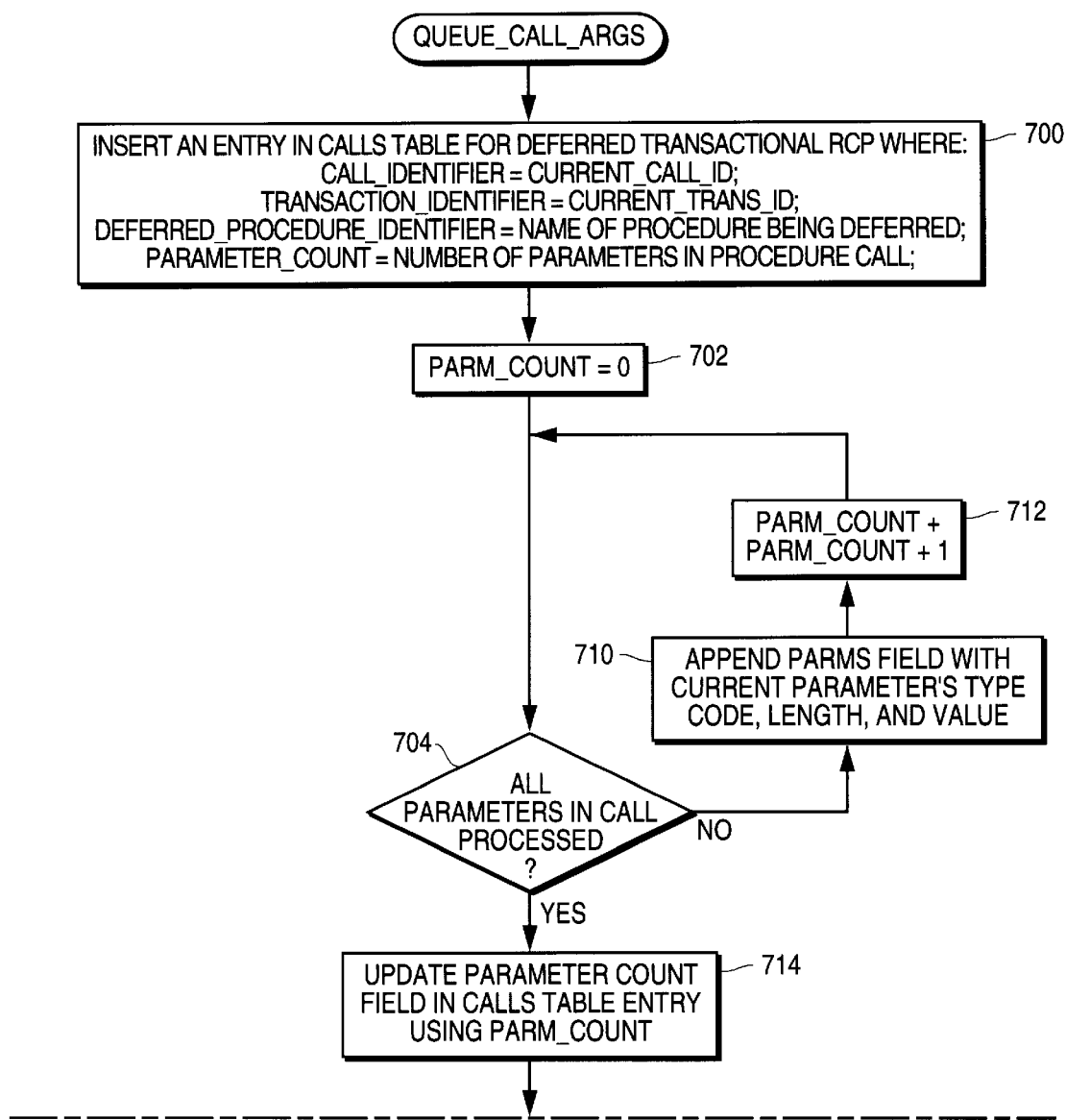
Figure 7B:
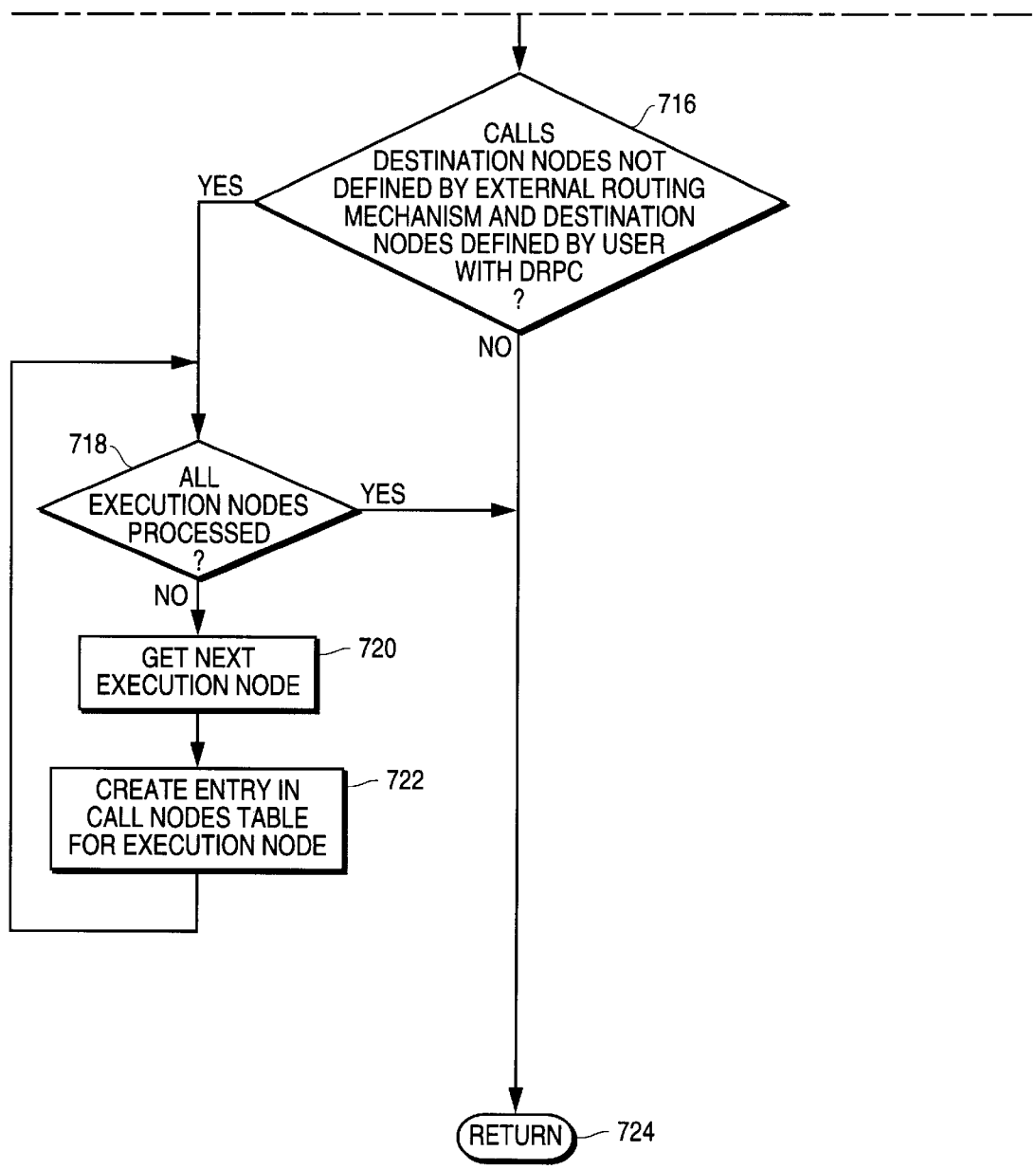

FIG. 7 illustrates a processing flow to queue call information. At processing block 700, an entry is created in the calls table for the procedure call currently being processed. The entry's call identifier field is set to the current_call_id. The same value assigned to the transaction identifier fields in the transactions and transaction nodes tables is used for the transaction identifier field in the calls table. The procedure identifier field is assigned a value that can uniquely identify the procedure being deferred. This value can be anything that identifies the procedure such as a procedure name or the storage location of the procedure.

During its execution, a procedure can use values (parameters) that are externally-generated (i.e., defined outside the procedure) and passed into the procedure, or internally-generated. In the preferred embodiment, the parameters are queued in the parms field of the calls table.

At processing block 702, parm_count is initialized to zero. At decision block 704 (i.e., "all parameters in call processed?"), if all of a procedure's parameters have been added to the parameters table, or the procedure does not have any associated parameters, processing returns at processing block 714. At block 714, the value of parm_count is used to update the parameter count field of the call's entry in the calls table.

At decision block 716 (i.e., "call's destination nodes not defined by external routing mechanism and destination nodes defined by user with DRPC?"), if the call's destination nodes (i.e., execution nodes) are defined by an external routing mechanism, processing returns at block 724. If the call's execution nodes are defined by the user with the DRPC and not by an external routing mechanism, processing continues at decision block 718. At decision block 718 (i.e., "all execution nodes processed?"), if all of the execution nodes have been entered in the call nodes table, processing returns at block 724.

If all of the execution nodes have not been processed, processing continues at block 720 to get the next execution node specified by the user. At processing block 722, an entry is created in the call nodes table for the current execution node. Processing continues at decision block 718 to process any remaining execution nodes.

If, at decision block 704 (i.e., "all parameters in call processed?"), parameters remain to be processed, processing continues at processing block 710. At processing block 710, the parameter's type (i.e., data type), length, and value are appended to any existing value in the parms field of the current calls table entry. At block 712, parm_count is incremented by one. Processing continues at decision block 704 to process any remaining parameters.

In an alternate embodiment, a call's parameters can be stored in a separate table, a parameters table (see FIG. 3). In the alternate embodiment, block 710 creates a separate entry in a parameters table for each parameter. Thus, a parameters table contains an entry for each parameter that is associated with a procedure. Each entry contains the call identifier, a parameter number (i.e., the number of the parameter in relation to the other parameters in the call), and the data type of the parameter. The value of the parameter is stored in one of the value fields (i.e., number, character, date, or rowid) based on the data type. For example, if the inventory_check procedure in the basic order transaction contained three parameters, three entries would be added to the parameters table.

Triggers

Figure 4:
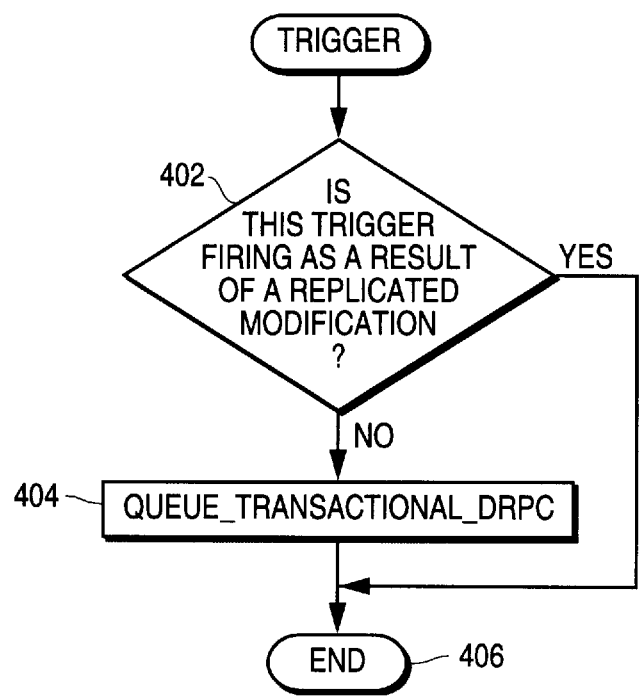
FIG. 4 illustrates a process flow of a trigger.

Triggers provide one alternative to initiate the population of the replication tables. A trigger is a procedure that is executed when any modification (e.g., update, insert or delete) is performed on an entry in a table at the local site. FIG. 4 provides an example of the process flow of a trigger in the present invention.

Decision block 402 (i.e., "is this trigger firing as a result of a replicated modification?") illustrates an issue addressed by a trigger in the present invention. Because a trigger is initiated when any modification operation is performed on a table, an operation that is performed on a remote data entry (i.e., a modification operation) will result in the initiation of a second trigger.

Unless a trigger contains some mechanism for differentiating between a modification done as a result of an original modification operation and a modification that is a replicated modification (i.e., the result of an earlier-fired trigger), the replicated modification will itself generate a trigger, and the original modification operation could be replicated multiple times at a data site unnecessarily. This would endanger the integrity of the data at the local and remote sites.

Thus, decision block 402 (i.e., "is this trigger a result of an earlier-fired trigger?") determines whether the table modification that generated the trigger is a consequence of an original or replication modification. If it is an original modification, the trigger is not the result of an earlier-fired trigger. However if the modification is the result of an original modification that has been replicated to a remote table, a second trigger should not be queued in the replication tables.

Therefore, if, at decision block 402 (i.e., "is this trigger a result of an earlier-fired trigger?"), a trigger is the result of replicated modification, a processing ends at block 406, and the modification procedure is not queued. If, at decision block 402, the trigger was generated as a result of an original modification, processing continues at processing block 404. At processing block 404, a modification entry is inserted in the replication tables. Processing then ends at block 406.

The mechanism for identifying duplicative replications can be implemented in various ways in the present invention. In the preferred embodiment, a duplicative replication can also be detected by setting a global variable (i.e., a variable that can be accessed by any trigger or replication procedure) before a replicated modification is performed. When the replicated modification is performed, the trigger can (at decision block 402 in FIG. 4) check the global variable to determine whether the modification is the result of a replication procedure or an original modification. This alternative of setting the global variable in the replication procedure is further illustrated in connection with row-level replication discussed below.

In an alternate embodiment, a duplicative replication can be detected by associating data modifications to a user. Thus, it is possible to identify an original modification by its user, and to identify a replicated modification by another user (i.e., modification procedures can be executed by a distinguished user). Thus, decision block 402 in FIG. 4 can check for the user name that invoked the modification. If the user is a distinguished user, the trigger was generated as a result of an earlier-fired trigger. If the user is not a distinguished user, the trigger was generated as a result of an original modification.

These alternatives provide examples of techniques for detecting duplicative modifications. Any means can be used to detect duplicative modifications without departing from the scope of the present invention.

Row-Level Replication Procedures

Row-level replication is a feature of the present invention that uses triggers to replicate row-level value-oriented modifications. That is, row-level replication provides an ability to replicate changes made to the values in a row. Row-level replication associates a trigger with a table (e.g., DbA's inventory in FIG. 2A) such that any changes made to one or more values in a local table entry (e.g., qoh field in DbA's inventory table of FIG. 2A) will trigger a like change to remote copies of the changed values (e.g., qoh field in DbB's inventory table of FIG. 2A).

A trigger causes the information associated with a procedure used to replicate the value changes in the local copy to a remote copy to be stored in the replication tables. The procedure, a deferred remote procedure call (DRPC), can be subsequently executed at remote sites to replicate the data modification(s) performed on local data. The name of the DRPC corresponds to the table being modified and the operation being performed on the local data (e.g., <table_name>_update). The DRPC has as its arguments (i.e., parameters), generally, the old values of the local data and the new values of the local data. The old values, or a subset thereof, uniquely identify the row that is the target of the modification. The use of these arguments is specific to the operation that is performed at the local site.

For example, if an update operation is performed on the local data, the old values would be used to detect conflicts. That is, a difference between the old values of the local data and the current values at the remote site may indicate that a separate operation has been performed on the remote data that may get erased with the current update. The new values can be used to update the remote data.

An insert operation (i.e., insert a row of values or a field value) there are no old values, and, therefore, no old values are included in the call. Further, there is no need to use old values to perform a check for conflicts (i.e., exceptions) at the row-level when inserting a new row or field value. The new values, or a subset thereof, uniquely identify a new remote table entry.

If the operation is a delete (i.e., delete a row or field), there are no new values. However, like an update operation, the old values can be used to detect potential conflicts. Further, the old values, or a subset thereof, can be used to uniquely identify the remote table entry to be deleted.

A DRPC name can incorporate the name of the table to be modified and the operation to be performed. Referring to FIG. 2A, for example, the triggers for the inventory table can have the names: inventory_insert, inventory_update, and inventory_delete). This naming convention assists in identifying the table and operation involved in the replication process. However, any naming convention can be used with the present invention.

Row-level insert

Figure 5A:
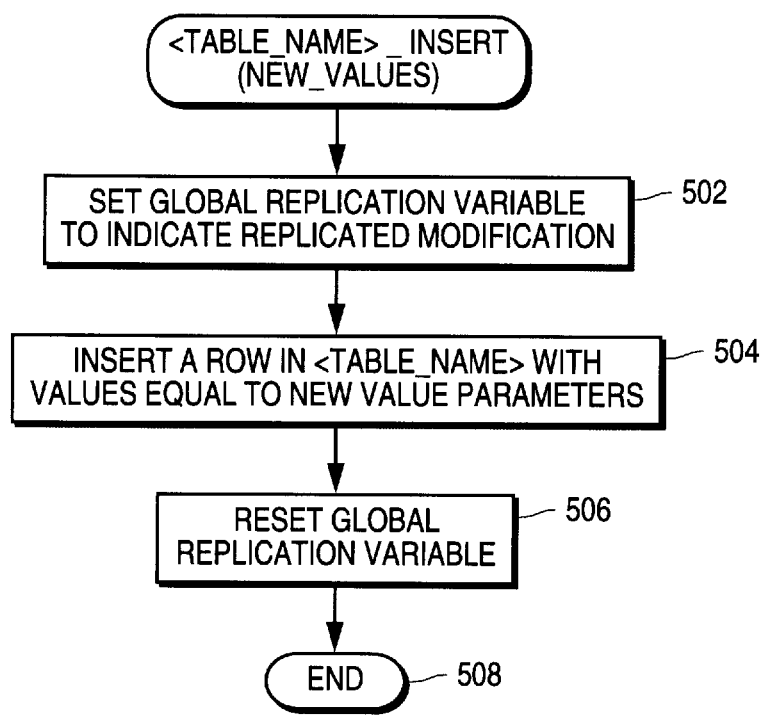
Figure 5C:
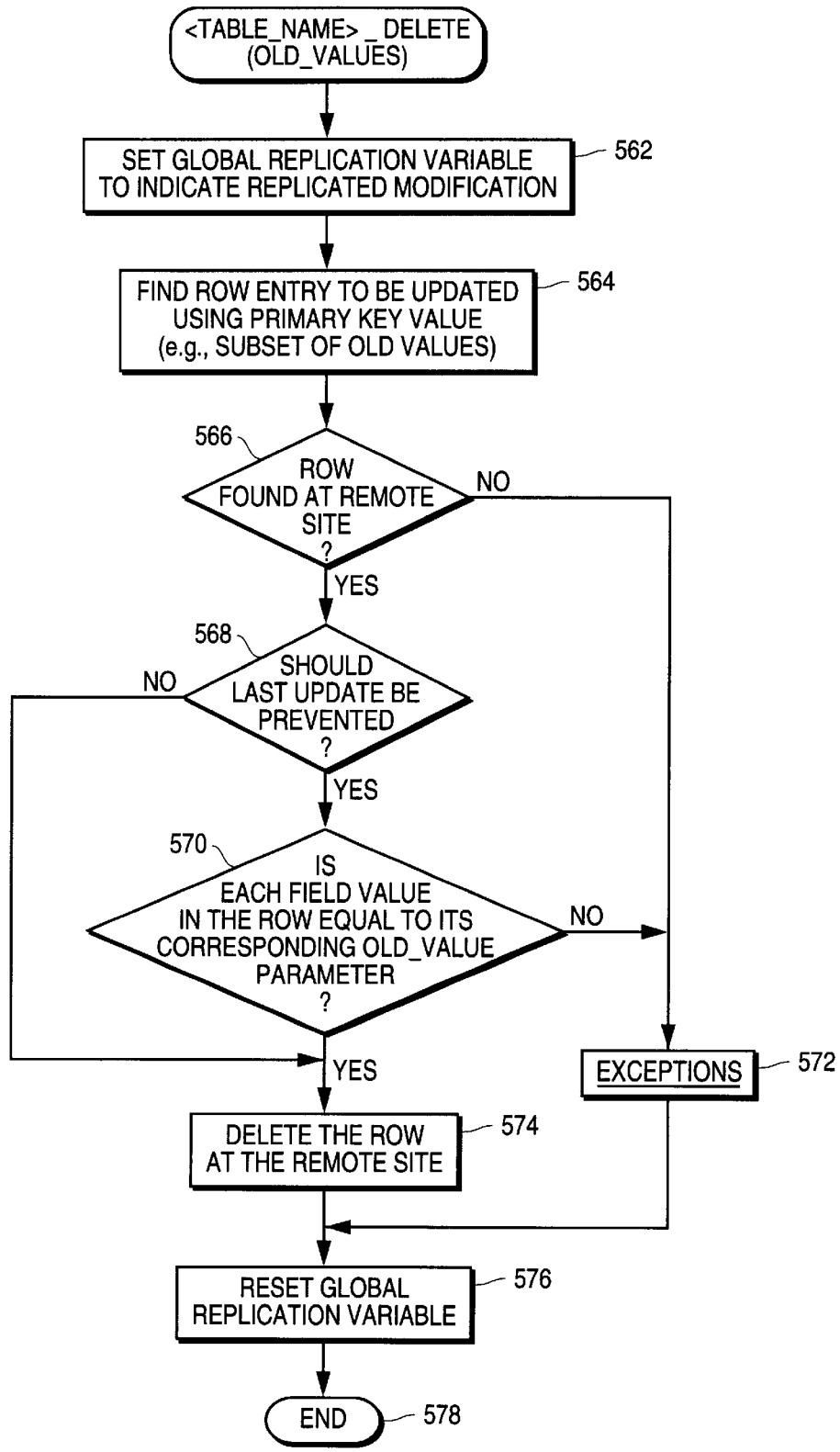

FIGS. 5A–5C provide an example of the process flow for the <table_name>_insert, <table_name>_delete, and <table_name>_update DRPCs. These DRPCs execute at sites remote from the original modification. Therefore, when they refer to "remote tables," they are referring to tables local to the DRPC's execution and remote from the original modification. FIG. 4A provides an example of the processing flow of a <table_name>_insert DRPC. As discussed previously, a global variable can be used as one alternative for identifying replicated modifications. Such a global variable is set at processing block 502. At processing block 504, a row is inserted in <table_name> using the value(s) provided in the new_values parameter(s).

To further illustrate the need to test for duplicative modifications, the replicated insert operation performed by the process of FIG. 5A would generate a trigger (i.e., any table modification initiates a trigger). Thus, the trigger process of FIG. 4 is invoked when the insert operation of processing block 504 (FIG. 5A) is performed. Because the global variable was set to indicate a duplicative modification (at processing block 502 of FIG. 5A), the trigger can determine (at processing block 402 of FIG. 4) that the modification is a replicated modification, and a DRPC will not be queued for the replicated modification (i.e., at processing block 404 in FIG. 4).

Continuing with the process flow of FIG. 5A, after the insert operation is performed on the remote table, the global replication variable is reset at processing block 506. Processing ends at block 508.

Row-level update

FIG. 5B provides an example of the processing flow of an update DRPC (e.g., <table_name>update). A global replication variable is set at processing block 522. At processing block 524, the remote table entry is identified using the old values, or a subset of the old values. At decision block 526 (i.e., "row found at remote site?"), if the remote table entry cannot be found, processing continues at processing block 532 to log an exception in the replication tables. Further, the global replication variable is reset at processing block 548, and processing ends at block 550. If the remote table entry is found, processing continues at decision block 530.

Before an update is made to a remote site, a check can be made to determine whether a modification has been made to the remote data that is independent of the current update operation that might be erased if the current update is performed on the remote data. This might occur, for example, when a modification (other than the current, replicated operation) could have originated at the remote site, the replication of which has not reached the site that invoked the current replicated update. If the current replicated update overwrites the remote table entry's values with the new-value parameters, the remote table entry's current values will be lost, and the remote table's original modification will, therefore, be lost.

Alternatively, in some applications, concurrent modifications to disjoint sets of non-primary field values can be permitted. For example, a modification to a customer's balance need not conflict with a change to a customer's address. If updates can be applied to non-primary fields on a field-by-field basis, concurrent updates are not lost. At decision block 530 (i.e., "type of lost update prevention?") determines whether the lost update is a row level update or a column level update. If it is a row level update, processing continues at decision block 536. If it is a processing continues processing continues at decision block 534.

At decision block 534 (i.e., "is each field value equal to its corresponding old_value parameter where the corresponding old value parameter is not equal to the corresponding new value parameter?"), if the old values are equal to their corresponding old_value parameter where the old value parameter is not equal to the new value parameter, processing continues at processing block 544 to update the fields that have been changed, and processing continues at block 548. If not, processing continues at decision block 538 (i.e., "should lost updates be prevented?"), if lost updates should be prevented, processing continues at block 540 to invoke Exceptions, and processing continues at block 548.

At decision block 536 (i.e., "is each field value equal in the row equal to its corresponding old_value parameter?"), if the old values are equal to their corresponding old_value parameter, processing continues at processing block 546 to update each field in the row with its corresponding new_value parameter, and processing continues at block 548. If not, processing continues at decision block 542 (i.e., "should lost updates be prevented?"), if lost updates should be prevented, processing continues at block 540 to invoke Exceptions, and processing continues at block 548.

At processing block the global replication variable is reset. Processing ends at block 550.
Row-level delete FIG. 5C provides an example of the processing flow of a delete DRPC (e.g., <table_name>delete). A global replication variable is set at processing block 562. At processing block 564, the remote table entry is identified using the old values, or a subset of the old values. At decision block 566 (i.e., "row found at remote site?"), if the remote table entry cannot be found, processing continues at processing block 572 to log an exception in the replication tables. Further, the global replication variable is reset at processing block 576, and processing ends at block 578. If the remote table entry is found, processing continues at decision block 528.

As in the update DRPC process, a check is made to determine if a check should be made for lost updates (i.e., modifications). Thus, decision block 568 (i.e., "should lost updates be prevented?") determines whether to test for potential lost updates (i.e., lost updates). If not, processing continues at processing block 574, and the remote table entry is deleted from the remote table. After the delete operation is performed on the remote table entry, the global replication variable is reset at processing block 576, and processing ends at block 578.

If, at decision block 568 (i.e., "should lost updates be prevented?"), existing modifications should be preserved, processing continues at decision block 570. At decision block 530 (i.e., "is each field value in the row equal to its corresponding old_value parameter?"), if any of the remote table entry's field values do not equal its corresponding old_value parameter, processing continues at processing block 572. At processing block 572, an exception is logged in the replication tables. Processing continues at block 576 where the global replication variable is reset, and processing ends at block 578.

If, at decision block 570 (i.e., "is each field value in the row equal to its corresponding old_value parameter?"), all of the field values in the remote table entry are equal to their corresponding old_value parameters processing continues at processing block 574. At processing block 574, the remote table entry is deleted from the remote table. After the delete operation is performed on the remote table, the global replication variable is reset at processing block 576, and processing ends at block 578.
Row-level Replication Example The replication illustrated in FIG. 2C (i.e., DbB=>DbA and DbA=>DbB) can be accomplished using triggers and row-level replication. The order for fifty widgets at the database A location resulted in the invocation of a basic order transaction to update the inventory table and place an order in the orders table. Either of these modifications will cause a trigger associated with either table to execute.

For example, when the qoh field of DbA's inventory table is updated by subtracting the quantity ordered, a trigger associated with the inventory table (and illustrated in FIG. 4) invokes the procedures of FIGS. 6 and 7 to populate the replication tables with a DRPC. In this case, an Inventory_update DRPC similar to the <table_name>_update DRPC illustrated in FIG. 5B can be used to replicate the changes in DbA's inventory table to DbB.

Figure 8A:
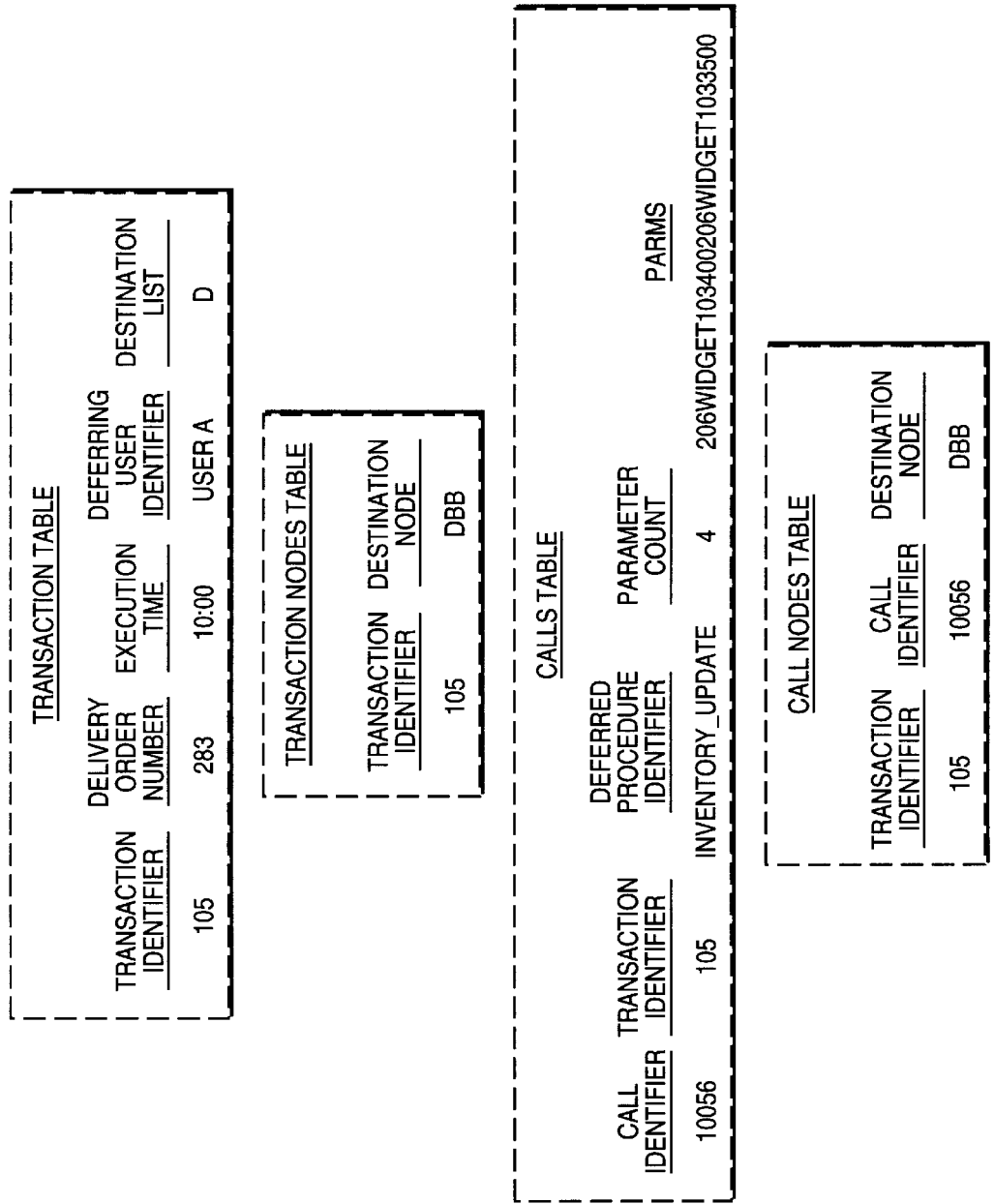
FIGS. 8A–8B illustrate replication tables including row-level replication information.

Referring to FIG. 6, if this is the first call, a transactional identifier is generated for the DRPC (i.e., <table name>_update) at processing block 602. At processing block 604, an entry is inserted into the transactions table as illustrated in FIG. 8A. A transaction identifier (e.g., 1), DON, time, and deferring user identifier are assigned to the inventory_update transaction.

At blocks 606 through 610, the transaction nodes table is populated. In this case, the only remote copy of the data is located at DbB. Therefore, one entry is inserted in the transaction nodes table where the transaction identifier is the same as the same field in the transactions table, and the destination node is set to DbB.

An entry is created in the calls table for each call in the transaction. Referring to FIG. 7, an entry is inserted into the calls table to reflect the inventory_update DRPC. The call identifier is a unique identifier for the inventory_update DRPC. The transaction identifier has the same value as the same field in the transactions and transaction nodes tables.

The deferred procedure identifier can be any value that identifies the DRPC. In this case, the name of the DRPC is used.

If an external routing mechanism is not being used, the call nodes table can be populated with the entries that identify the user specified destination nodes at which execution of the DRPC is deferred (i.e., execution nodes). Referring to 8A, the destination list field indicates that the destination nodes are not specified by an external routing mechanism. In this case, the destination nodes for the transaction's one DRPC (i.e., inventory_update) can be determined by the entry in the transaction nodes table. However, the call nodes table can be used to identify DbB as the destination node for execution of the inventory_update DRPC.

Any parameters associated with a call are stored in the call's entry in the calls table. Referring to FIG. 5B, the update procedure uses the widget's old inventory values and new inventory values. The widget entry in the inventory table is uniquely identified by the old value "widget." Because each entry in the table contains two fields, there will be two old values and two new values. Therefore, there are four arguments associated with the inventory_update procedure. The arguments (including an example of their attributes) are as follows:

| Old values | | | New values | | |
|---|---|---|---|---|---|
| Type | Length | Value | Type | Length | Value |
| 2 | 06 | Widget | 2 | 06 | Widget |
| 1 | 03 | 400 | 1 | 03 | 350 |

The parms field in the calls table entry associated with this call contains a string of parameter information. A terminating value (e.g., "0") is placed at the end of the string. The resulting string is: "206Widget1034004206Widget1033500."

If inventory_update is considered to be a non-transactional DRPC, the process of inserting entries in the transactions and transaction nodes tables could be bypassed. To associate the non-transactional DRPC with the destinations at which the DRPC is to be executed, the call nodes table can be used. An entry can be placed in the call nodes table for each location at which the call is to be executed.

Figure 8B:
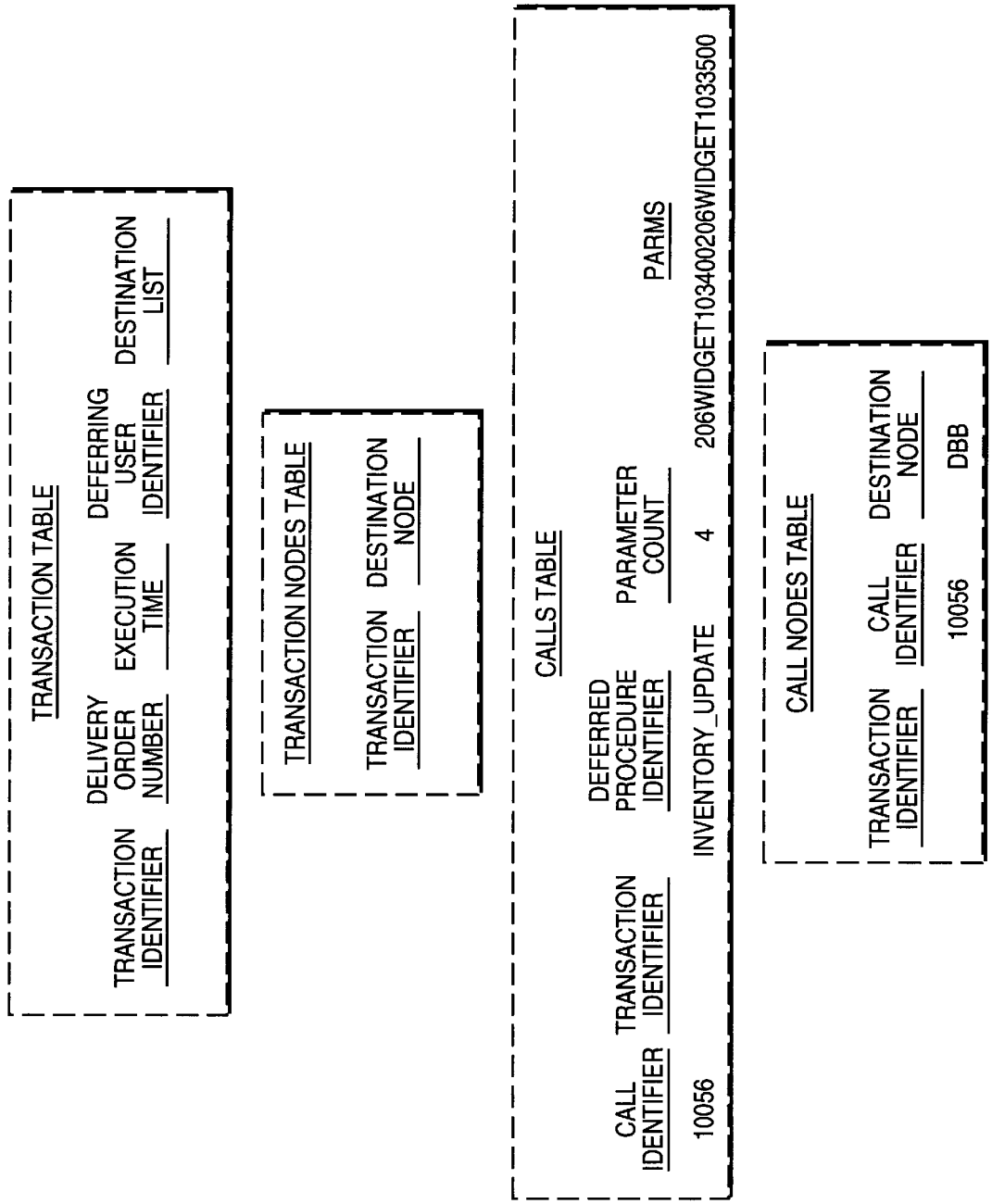
Figure 8C:
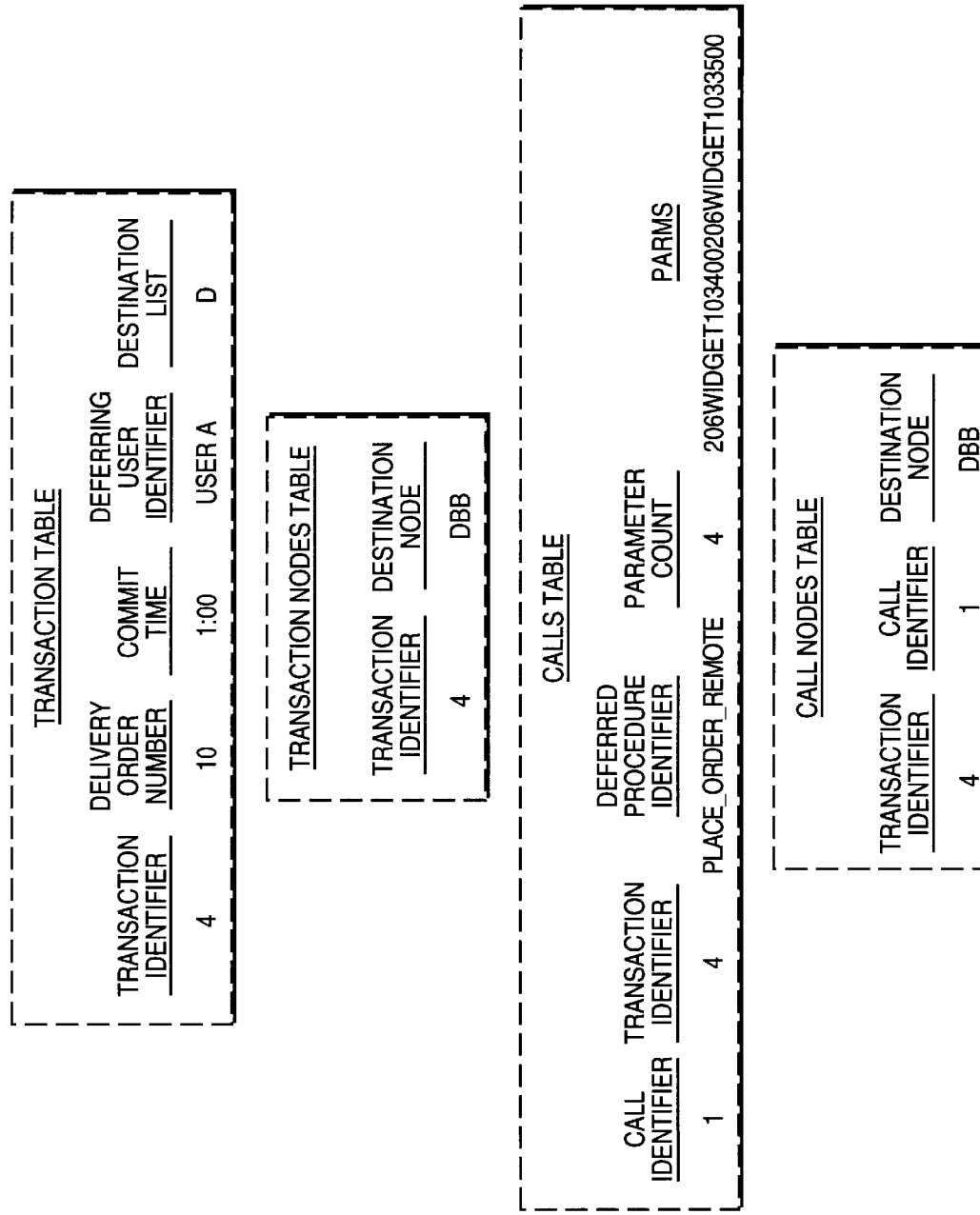

FIG. 8B illustrates the state of the replication tables after their population with a non-transactional DRPC. The transactions and transaction nodes tables are not used. The calls and call nodes tables are the same as in FIG. 8A with the exception of the transaction identifier field. Since there is no associated transaction, there is no entry in the transaction and transaction nodes tables, and no transaction identifier value.

Column-Level Replication

Column-level replication is a variation of lost update prevention for row-level replication. Column-level replication applies only to update operations. In column-level replication, concurrent updates can be made to disjoint sets of non-primary key columns. Lost updates are prevented only when the updates are to columns whose values have been changed (i.e., those columns changed at the originating site as indicated by a difference between the old_value and new_value parameters).

Column-level replication uses the same <table name>_update procedure as row-level replication. FIG. 5B illustrates the differences in the logic for detecting lost updates and applying updates for row-level and column-level replication schemes. A row-level replication scheme determines that a remote site's current values match old values for all columns in a table entry (at decision block 536) prior to applying an update at a remote site. Column-level replication checks (at decision block 534) only those columns that were changed by the original update (as indicated by a difference between the values of the corresponding old and new parameters). If the old_value parameters of the changed columns are equal to their corresponding values at the remote site, the loss of an intermediate update is unlikely, and the update operation can be completed. If the old_value parameters of the changed columns are not the same as their corresponding values and lost updates are to be prevented (at decision block 538), an exception is raised (processing block 540), and the update operation is not performed. If lost updates are not to be prevented (at decision block 538), the update operation can be performed.

A row-level update operation involves all of the columns in a table entry (at processing block 546). However, a column-level update operation involves only those columns changed by the original update (as indicated by a difference between the values of the corresponding old and new parameters). Thus, in a column-level update operation, only those columns changed by the original update are updated with their corresponding value in the new_value parameters (processing block 544).

Procedure-Level Replication

Procedure-level replication provides another alternative for replicating data modifications. As previously discussed, row-level replication is value oriented. That is, the values that are the result of some operation are replicated to remote copies. In contrast, procedure-level replication provides the ability to replicate the logical operation at remote sites. That is, the procedure that modified the local copy can be replicated at the remote sites. Thus, after the execution of a procedure at the originating site, the procedure creates a DRPC such that the procedure defers itself to another site to apply the logical update on a remote copy.

Procedure-level replication provides additional flexibility in that an application (e.g., order processing example in FIGS. 2A–2C) can determine how a replication is to be propagated, and how replication conflicts (e.g., multiple conflicting updates to the same data item) are to be addressed. That is, a DRPC can designate its propagation and the process to be invoked when replication conflicts are identified.

Figure 9A:
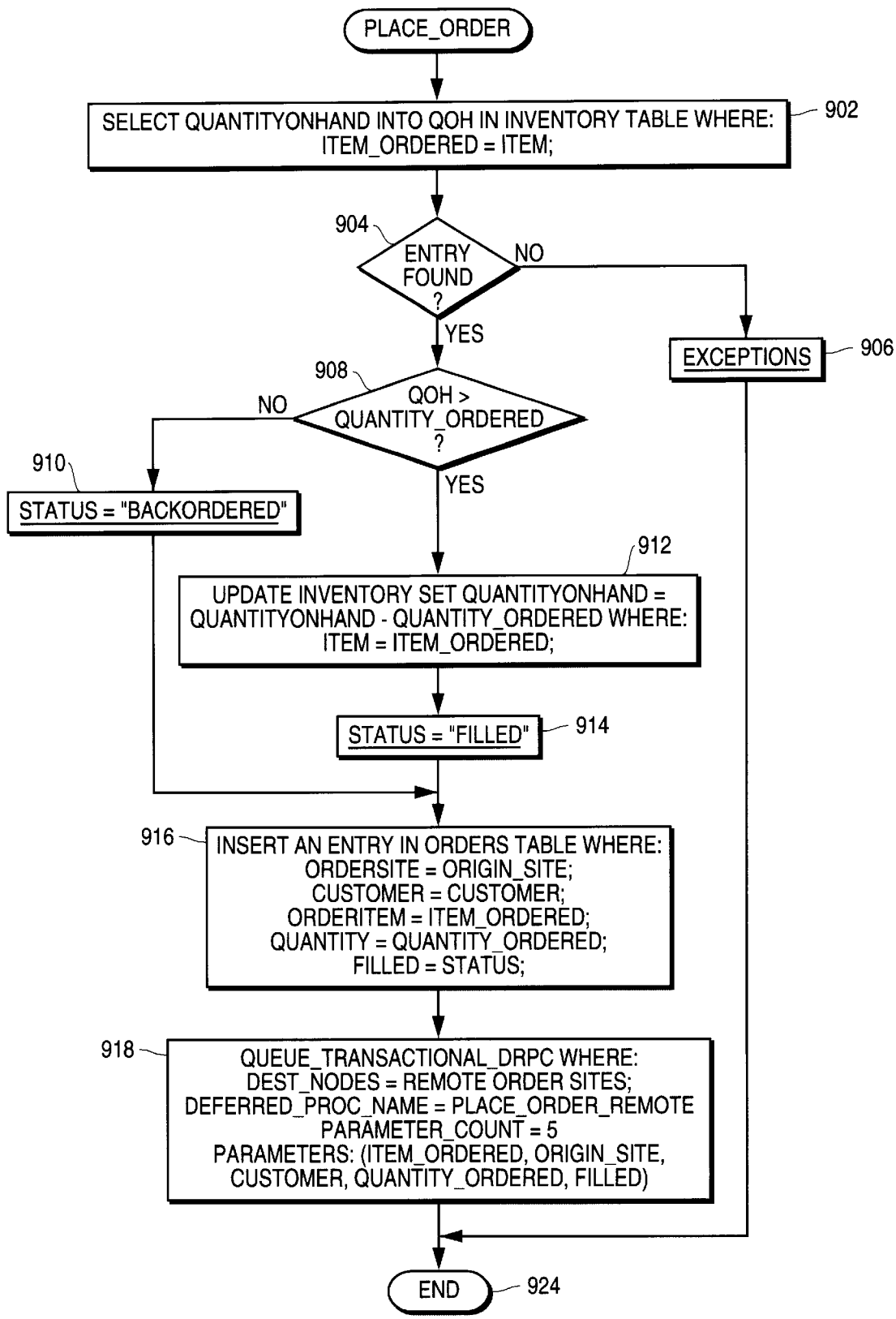
FIGS. 9A–9b illustrate procedures using procedure-level replication.
Figure 9B:
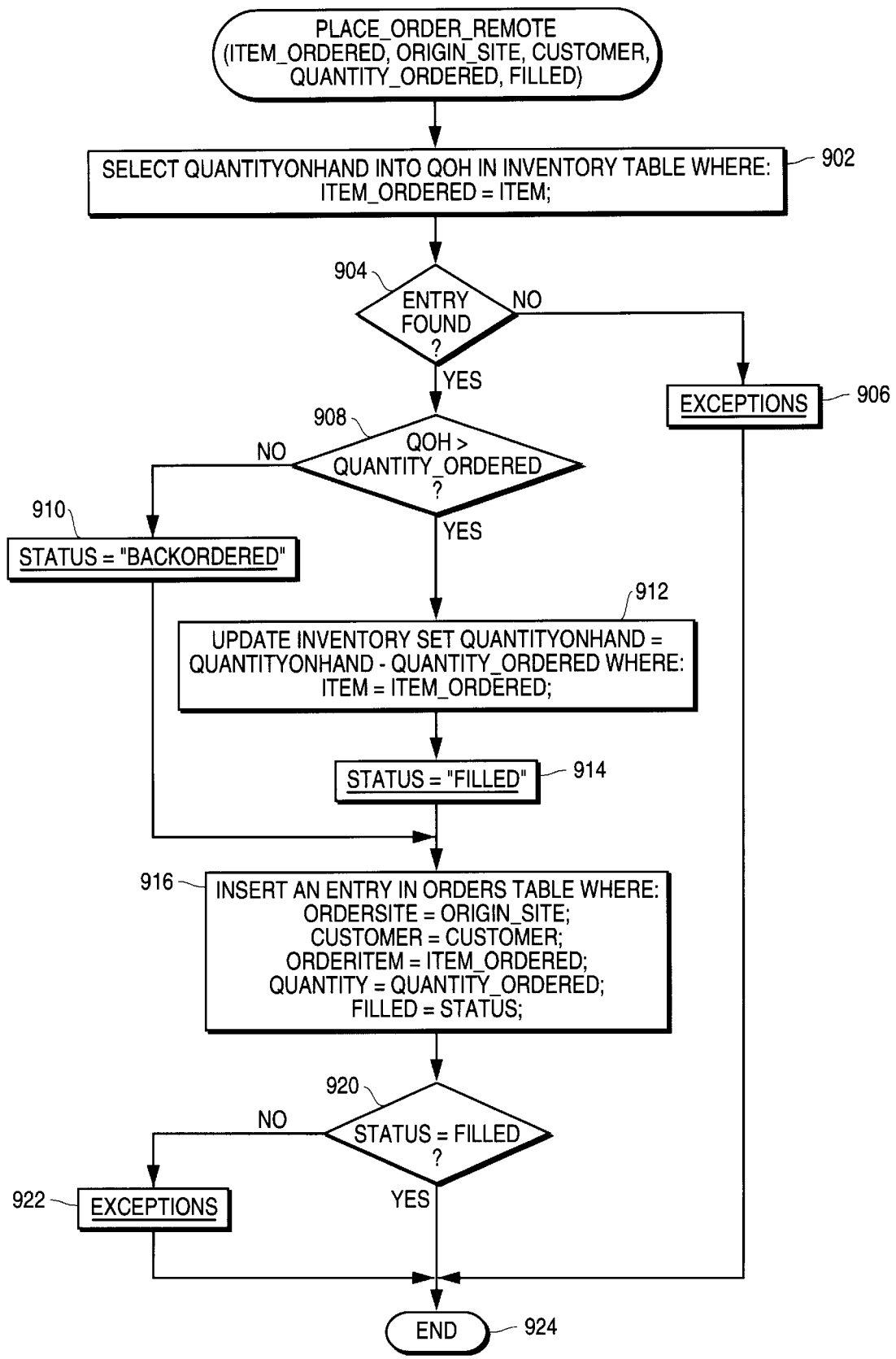

FIGS. 9A–9B provide an example of an application that uses procedure-level replication to replicate its logical operations to other sites. The application assumes the relations (i.e., tables) described in FIGS. 2A–2D. Further, any changes made to the tables at the DbA site must be replicated at the DbB site, and vice versa.

In the basic order transaction illustrated in FIGS. 2B–2C, once a customer's order is received, the inventory table is updated to reflect a decrease in inventory by the quantity ordered, and an entry is inserted in the orders table to retain information about the order. If the order is received and processed at DbA, the same order processing is replicated at DbB as illustrated in FIG. 2D.

FIG. 9A illustrates the original order processing that is performed when an order is received at one of the sites (e.g., DbA). To summarize the order processing at DbA, at processing block 902, the item ordered is found in the inventory table, and the inventory amount is stored in qoh. If the entry is not found, an exception is raised at block 906. If the inventory amount (i.e., qoh) is greater than the quantity ordered, the inventory amount is decreased by the quantity ordered, and the order is considered to be filled at blocks 908, 912, and 914. If the inventory amount is not greater than the quantity ordered, the order is considered to be backordered. In either case, the order is entered into the orders table at processing block 916.

Once the order is processed at DbA, the order processing is replicated at remote sites by entering the replicated procedure in the replication tables, and subsequently executed the replicated procedure at the remote sites. At processing block 918, the information associated with the replicated procedure is stored in the replication tables by invoking Queue_transactional_DRPC. As described earlier, Queue_transactional_DRPC stores the replicated information in the tables. Processing block 918 further illustrates some of the information that is stored in the replication tables.

Figure 10:
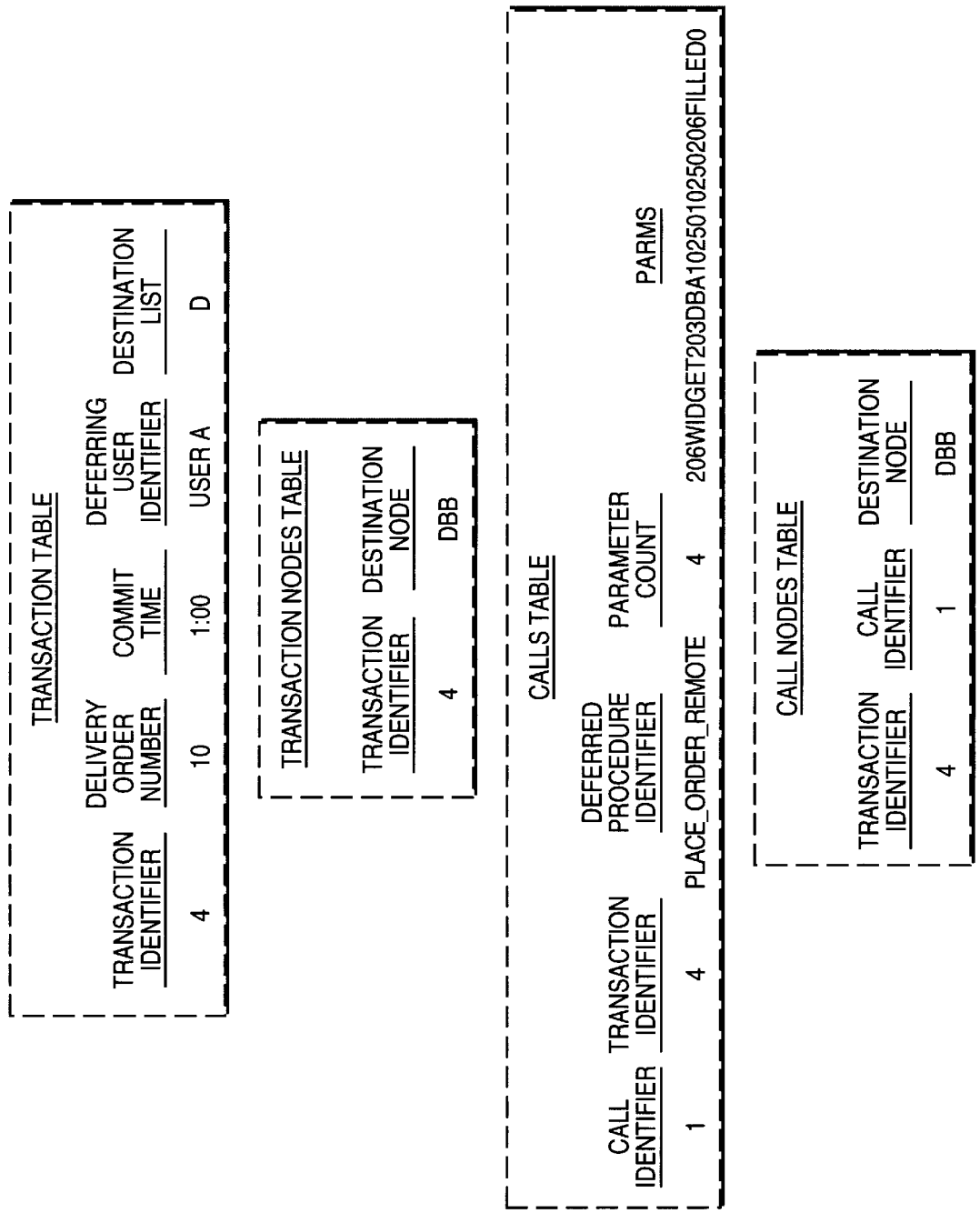
FIG. 10 illustrates replication tables including procedure-level replication information.

FIG. 10 illustrates the state of the replication tables after Queue_transactional_DRPC has processed the replicated procedure's information. The transactions table is populated with a transaction identifier to uniquely identify the order processing transaction, as well as the transaction's DON, commit time, and deferring user. The transaction nodes table has one entry for the remote copy of the inventory and orders tables located in DbB.

The calls table contains an entry to identify the place_order_remote procedure for this order processing transaction (i.e., 4), and the parameter count is set to five. The parameters field in the calls table contains the parameter information (i.e., item ordered, originating site, customer, quantity ordered, and the order's status in the DbA database). The call nodes table contains an entry to identify the node at which the place_order_remote DRPC is to be executed.

FIG. 9B provides an example of the remote processing of the place order process at DbB. Except for the change in the data copy being modified, the processing blocks 902 through 916 are the same as the same blocks in FIG. 9A. As stated previously, procedure-level replication provides the ability to allow an application to handle exceptions that occur as a result of the replication of the procedure at other sites. In the present example, a check is made to determine whether there is a discrepancy in the ordered item's inventory count in DbA and DbB. One way of determining this is by determining whether the order could be filled based on the QuantityOnHand information in both databases. Thus, at decision block 920 in FIG. 9B (i.e., "status=filled?"), the order's status at DbB is checked against the order's status at DbA. If they are not equal, an exception can be raised for later review.

Instead of raising an exception for later review, other methods of addressing this discrepancy can be included in the procedure. In the present example, the procedure could have been designed to either modify the order at DbA, or at DbB. In any case, the present invention provides the ability to allow an application to process exceptions using procedure-level replication. Whether or not a discrepancy is detected at decision block 920, processing ends at 924.

Deferred Remote Procedure Call Initiation

As previously indicated, once a DRPC has been placed in the replication tables, the present invention provides the ability to subsequently execute the DRPC at a remote site. FIG. 11A illustrates a process for initiating deferred, transactional DRPCs contained in the replication tables.

The selection of transactional DRPCs can be performed using a number of different criteria. For example, they can be selected based on the transaction identifier, transaction destination, or a combination of the two. Whatever the selection criteria, the transactions to be processed are selected at processing block 1102. Select transactions are ordered for execution according to the DON field in the transaction table entries. At decision block 1104 (i.e., "all selected transactions processed?"), if all of the selected transactions have been executed, processing ends at 1132.

If there are remaining transactions, the next transaction is obtained, and its identifier is stored in current_trans_id at processing block 1106. The modification operations performed in a transaction can be undone before they are committed. At processing block 1108, a point (i.e., savepoint) is established to identify the state of the data prior to the modifications of the current transactions.

At decision block 1110 (i.e., "all calls processed?"), if all of the calls in the current transaction have been processed, processing continues at processing block 1112. At block 1112, the entry in the transaction nodes table that corresponds to the transaction processed and the remote copy modified are deleted from the transaction nodes table. At decision block 1114 (i.e., "anymore remote copies to apply DRPC to?"), if there is some need to retain the current transaction's entry in the replication tables, processing continues at processing block 1118. If there is no need to retain the entry in the replication tables, the entry is deleted from the replications table at processing block 1116. At processing block 1118, the current transaction's modifications are committed making its modifications permanent. Processing continues, at decision block 1104 (i.e., all selected transactions processed?"), to perform the remaining transactions.

If at decision block 1110 (i.e., "all calls processed?"), if all of the DRPCs have not been executed in the current transaction, processing continues at processing block 1120. At processing block 1120, a call nodes table entry for the destination node currently being processed. Processing block 1121 identifies a calls table entry for the call identified in processing block 1120.

At processing block 1122, the DRPC call string is reconstructed. A DRPC call string is one technique for identifying the DRPC to be executed. Other means for identifying the DRPC can be used. For example, a DRPC can be identified by an internal representation of the call string. In this case, the DRPC can be executed by an optimized low level system interface using the internal representation. Thus, the call can be invoked without reconstructing an DRPC call in its entirety.

If the DRPC is identified and executed using a conventional DRPC call string, the reconstructed call string for the place_order_remote procedure call in the calls table in FIG. 10 is: place_order_remote (Widget, DbA, 10, 50, filled). If the remote site is included in the call, the call is: place_order_remote @DbB (Widget, DbA, 10, 50, filled).

Figure 13:
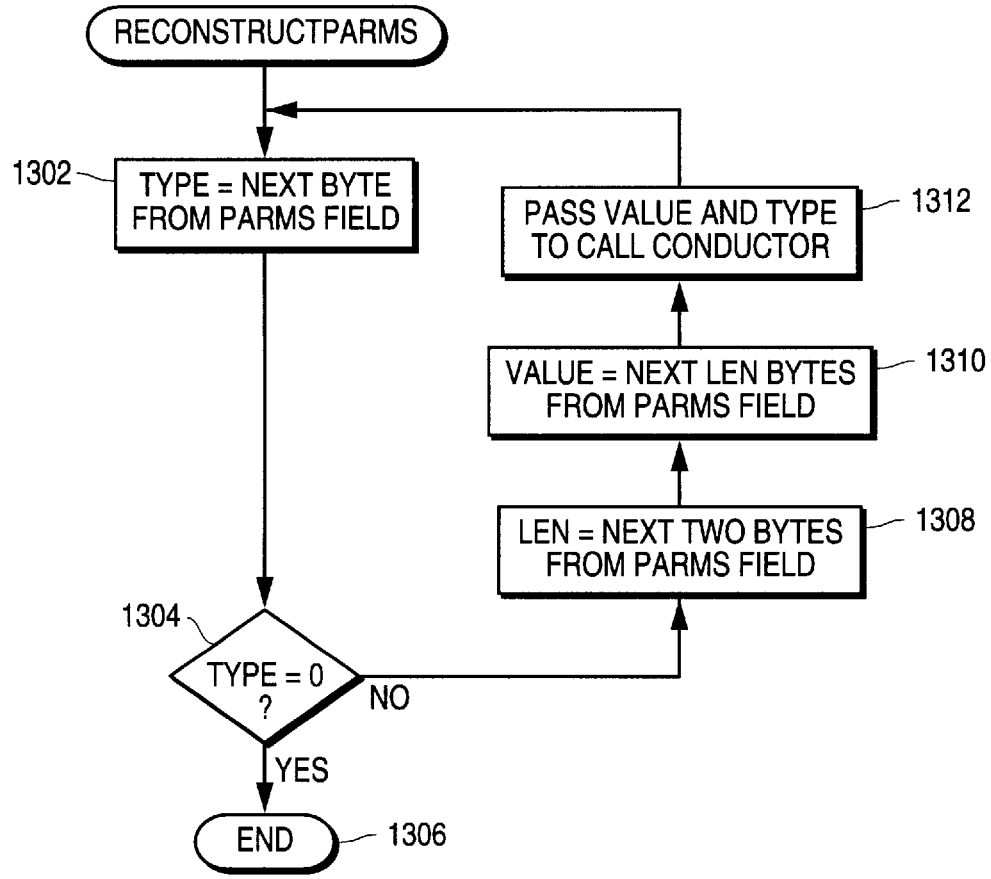
FIG. 13 illustrates a ReconstructParms process flow.

Referring to FIG. 11A, at processing block 1122, a DRPC call string is reconstructed using the procedure identifier and parms fields from the calls table. The parameters for a call are reconstruct using the parms field in the calls table. FIG. 13 illustrates a process flow for parsing the parms field. At processing block 1302, a byte is extracted from the parms field. This byte represents the type of the current parameter in the parms field.

At decision block 1304 (i.e., "Type=0?"), if the byte extracted from the parms field is equal to a termination value, processing ends at block 1306. If the byte is not a terminating value, processing continues at processing block 1308 to set "Len" to the next to bytes of the parms field. At processing block 1310, "Value" is set to the next "Len" bytes from the parms field. At processing block 1312, the contents of "Value" and "Len" are passed to a call constructor facility to incorporate this parameter information in the reconstructed call. Processing continues at block 1302 to process any remaining parameters in the parms field.

Referring to FIG. 11A, at processing block 1124, the procedure is executed at the remote site. At decision block 1126 (i.e., "successful execution?"), if the procedure was successfully executed, processing continues at processing block 1127 to delete the selected call nodes table entry. Processing continues at decision block 1110 to check for additional calls to process.

If the procedure's execution was unsuccessful, the modifications made since the savepoint previously created are undone at processing block 1128. At processing block 1130, the Exceptions is invoked to create an entry in the Exceptions table to retain information concerning the unsuccessful completion of the procedure. The exception table can be stored at any location (e.g., originating, destination, or both sites). In the preferred embodiment, the exceptions table is stored at the destination site. Processing continues at decision block 1104 with any remaining transactions.

Exception Process Flow

Figure 12:
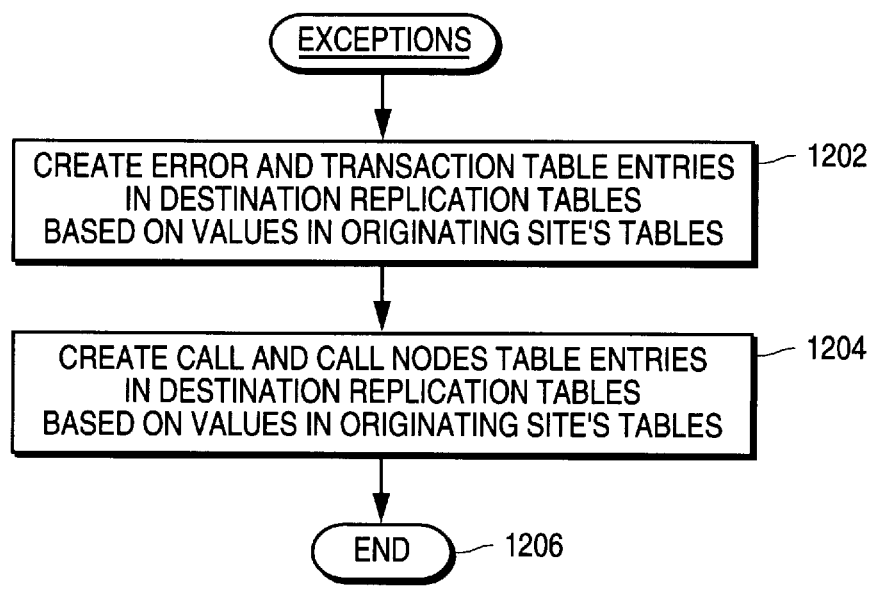
FIG. 12 illustrates a Exceptions process flow.

An exception can be stored in a relation that is located on either the originating or destination sites, or both. FIG. 12 illustrates a process flow for storing an exception. At block 1202, entries are created in the error and transaction tables in the destination replication tables based on the values in the originating site's tables. At processing block 1204, entries are created in the calls and call nodes table in the destination replication tables based on the values in the originating site's tables. At block 1206, processing ends.

Figure 11B:
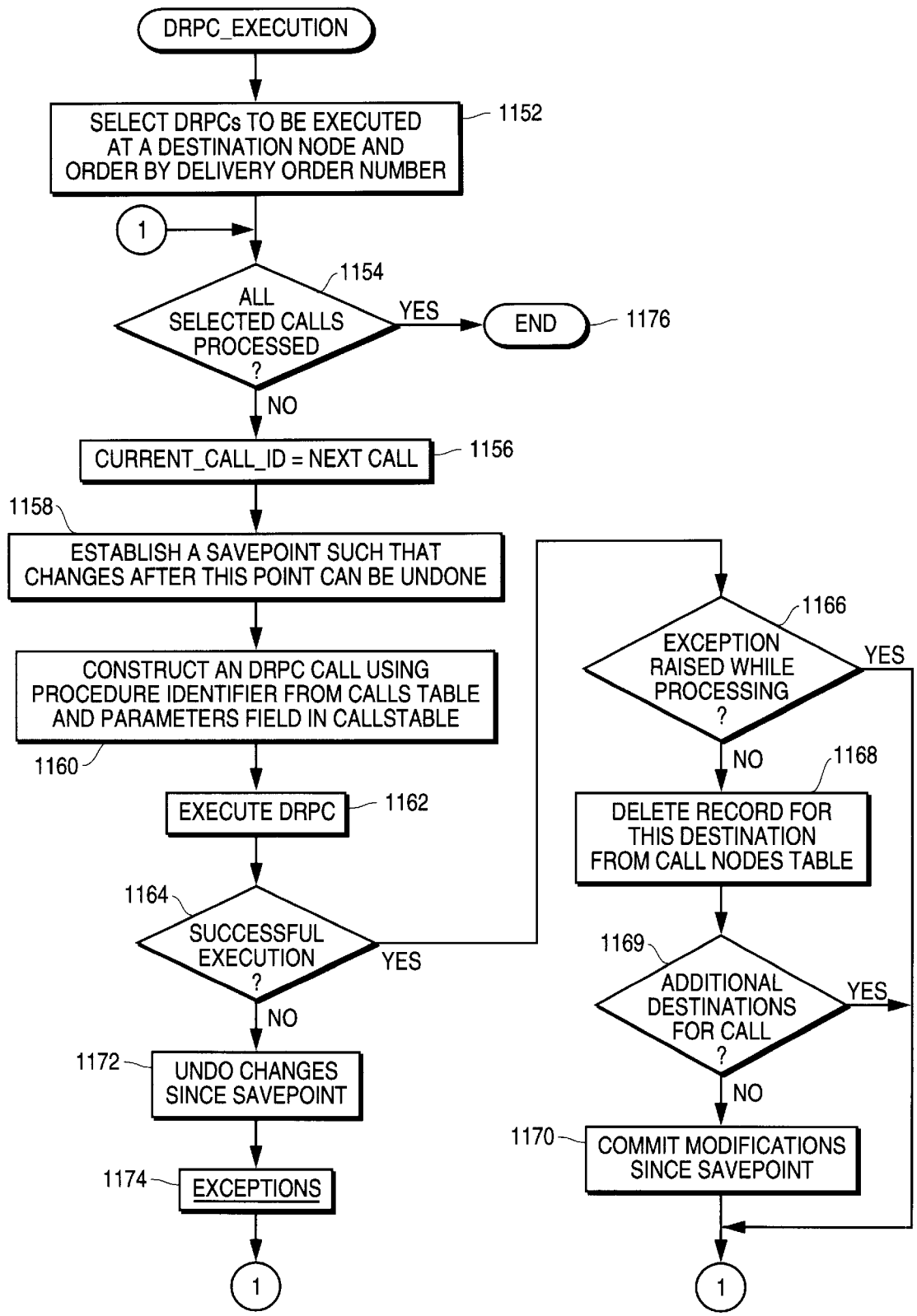

FIG. 11A illustrated a method for executing transactional DRPC entries contained in the replication tables. Other methods can be used to process the replication table entries using replication capabilities of the present invention. For example, the present invention provides the ability to execute non-transactional DRPC entries contained in the replication tables. FIG. 11B illustrates a method for executing non-transaction DRPC entries.

At processing block 1152, the non-transactional DRPCs to be executed are selected. At decision block 1154 (i.e., "all selected calls processed?"), if all of the DRPCs selected have been processed, processing ends at block 1174. If there are calls remaining, processing continues at processing block 1156 to select the next call and identify it by its call identifier. As in FIG. 11A, the processing of a non-transactional DRPC in FIG. 11B includes establishing a savepoint (at block 1158), constructing an DRPC call (at block 1160), and executing the DRPC at a remote site (at block 1162). If the execution is not successful, the changes since the savepoint are undone (at block 1172) and an exception is raised (at block 1174). If the execution is successful and no exceptions are raised during the execution, the record for this destination is deleted from the call nodes table (at block 1168), and processing continues at decision block 1169. At decision block 1169 (i.e., "additional destinations for call?"), if there are additional destinations for the current call, processing continues at decision block 1154 to processing any remaining calls. If there are no additional destinations for call, the modifications are committed at block 1170.

Conflicts

The present invention provides the ability to identify conflicting modifications. For example, updates that have occurred to a remote copy of the data may be lost, if the replicated modification overwrites the current values in the remote copy. Thus, it is important to detect any conflicts. Further, if a conflict is detected, the present invention provides the ability to communicate an exception, to rollback any changes to a data copy after an exception is detected, and to incorporate exception handling in an application program. Exceptions and conflict information can be stored at the originating site, the destination site, or both.

Conflict Detection

As stated previously, a row-level replicated deferred remote procedure call has both the old and new values as part of its parameters. Thus, a potential conflict can be detected by comparing the old values of the row at the original updating site with the current value of the row at the targeted site for the replicated modification. If the values are different, a conflict exists between the local and remote data copies.

As previously illustrated the present invention provides the ability for an application, such as the order processing example described herein, to include error detection. As illustrated in the order processing example, the place_order_remote process includes examination of the local and remote copies of the order status. Thus, the present invention provides the ability for an application to identify conflicts within one of its procedures.

Treatment of Conflicts

When a conflict is detected, information regarding the conflict can be identified and stored in the exceptions table (see FIG. 3). The fields of the exception table provide an error code and a descriptive error string. In addition, the exceptions tables provides keys into other replications tables. This provides the ability to access the information stored in the replication tables associated with a DRPC in which the exception is raised.

For example, as a key into the transactions table, the exceptions table can contain a transaction identifier that corresponds to the current transaction being processed. To access the related entry in the calls table, the exceptions table further contains the call identifier of the current calls table entry being processed and the destination node (i.e., remote copy location). The calls table can be accessed using a procedure's call_id.

In addition to retaining information regarding a conflict, the present invention provides the ability to undo a deferred transaction such that all updates deferred by the original transaction are undone. The execution of deferred calls is contingent upon successful commit of a deferring transaction. If the deferring transaction is rolled back, the deferred calls' queue encoded in the replication is rolled back.

The present invention further provides the ability to incorporate error handling in an application. Thus, an error can be handled as soon as an error is detected, or deferred for later processing. The exceptions table provides the ability to address any errors after an application's normal processing. The subsequent error processing can be done with various degrees of operator intervention and automation. The present invention provides the flexibility to allow an application to address the type of error handling.

Multiple conflict routines can be supplied to be used to resolve a conflict when it arises. They can be called in order until one of them returns a successful return value. If none of the resolution routines are successful, the exception is retained as an exception.

Thus, a method and apparatus for data replication has been provided.

We claim:

1. A computer-implemented method for peer-to-peer data replication comprising the steps of:

performing a first modification to a first data value in a first computer and a second modification to a second data value in a second computer, said first and second data values being consistent prior to said first and second modifications;

generating first modification information in said first computer that is indicative of said first modification and second modification information in said second computer that is indicative of said second modification;

communicating said first modification information from said first computer to said second computer in response to performing the first modification;

communicating said second modification information from said second computer to said first computer in response to performing said second modification; and modifying during a first time interval said first data value in said first computer and said second data value in said second computer based on said second modification information and said first modification information, respectively, to restore consistency between said first and second data values, said first and second computers being operational throughout said first time interval.

2. The method of claim 1 wherein said step of performing a first modification to a first data value comprises the step of setting an indicator in said first computer to indicate that said first modification has been performed in said first computer.

3. The method of claim 1 wherein said step of performing a first modification and said step of modifying said second data value based on said first modification information precede said step of performing a second modification an said step of modifying said first data value based on said second modification information.

4. The method of claim 1 wherein said step of modifying said first data value and said second data value based on said second and first modification information comprises the step of identifying exceptional occurrences.

5. The method of claim 4 further comprising the step of storing said first modification information and information indicative of at least one of said exceptional occurrences in one or more tables.

6. The method of claim 5 wherein said step of storing said first modification information in one or more tables in a database comprises the step of queuing a plurality of database transactions in the one or more tables, the plurality of database transactions indicating operations necessary to replicate said step of performing a first modification to a first data value in a first computer.

7. The method of claim 5 wherein said step of storing said first modification information in one or more tables in a database comprises the step of storing an identification value in a transaction identification field of a transaction table, the identification value uniquely identifying the first modification to the first data value in the first computer.

8. The method of claim 5 wherein said step of storing said first modification information in one or more tables in a database comprises the step of storing information indicating a procedure executed to modify the first data value in the first computer.

9. The method of claim 5 wherein said step of storing said first modification information in one or more tables in a database comprises the step of storing information indicating a data value to replace the first data value.

10. The method of claim 4 wherein said step of modifying said first data value and said second data value based on said second modification information and said first modification information, respectively, comprises the step of executing a procedure to modify said first data value.

11. The method of claim 10 wherein said step of identifying exceptional occurrences is incorporated into execution of said procedure.

12. The method of claim 4 wherein said step of identifying exceptional occurrences comprises the step of determining whether said first and second data modifications conflict.

13. The method of claim 1 wherein said step of generating said first modification information further includes the steps of:

obtaining information regarding a logical unit of work;

obtaining information regarding a procedure for replicating said logical unit of work; and obtaining information regarding a destination at which said procedure is to be performed.

14. The method of claim 13 wherein said step of obtaining information regarding a logical unit of work comprises the step of obtaining information regarding modification of a data value.

15. The method of claim 14 wherein said step of obtaining information regarding modification of a data value comprises the step of obtaining information regarding modification of a data value in a database.

16. The method of claim 13 further comprising the step of obtaining information regarding exceptional conditions raised during said first and second data modifications.

17. The method of claim 13 wherein said step of obtaining information regarding a destination at which said procedure is to be performed comprises the step of obtaining information identifying one of a plurality of networked computers at which said procedure is to be performed.

18. An apparatus for peer-to-peer data replication comprising:

means for performing a first modification to a first data value in a first computer and a second modification to a second data value in a second computer, said first and second data values being consistent prior to said first and second modifications;

means for generating first modification information in said first computer that is indicative of said first modification and second modification information in said second computer that is indicative of said second modification;

means for communicating said first modification information from said first computer to said second computer in response to performing the first modification;

means for communicating said second modification information from said second computer to said first computer in response to performing the second modification; and means for modifying during a first time interval said first data value in said first computer and said second data value in said second computer based on said second modification information and said first modification information, respectively, to restore consistency between said first and second data values, said first and second computers being operational throughout said first time interval.

19. The apparatus of claim 18 wherein said means for performing said first data modification is a processor executing a procedure.

20. The apparatus of claim 19 wherein said procedure includes instructions which, when executed by said processor, cause said processor to identify and handle said exceptional occurrences.

21. The apparatus of claim 18 wherein said means for modifying said first data value and said second data value based on said second modification information and said first modification information, respectively, comprises means for identifying exceptional occurrences.

22. The method of claim 18 wherein said means for generating first modification information comprises:
  means for obtaining information regarding a logical unit of work;
  means for obtaining information regarding a procedure for replicating said logical unit of work; and
  means for obtaining information regarding a destination at which said procedure is to be performed.

23. The apparatus of claim 22 wherein said means for obtaining information regarding a logical unit of work comprises means for obtaining information regarding modification of a data value.

24. The apparatus of claim 22 further comprising means for obtaining information regarding exceptional conditions raised during said first and second data modifications.

25. An article of manufacture comprising a computer usable mass storage medium having computer readable program code embodied therein which, when executed by a first computer and a second computer, causes said first and second computers to perform computer-implemented peer-to-peer data replication, said computer readable program code in said article of manufacture comprising:
  computer readable program code which, when executed by said first and second computers, causes said first computer to perform a first modification to a first data value stored in said first computer and said second computer to perform a second modification to a second data value stored in said second computer, said first and second data values being consistent prior to said first and second modifications;
  computer readable program code which, when executed by said first and second computers, causes said first computer to generate first modification information indicative of said first modification and said second computer to generate second modification information indicative of said second modification;
  computer readable program code which, when executed by said first and second computers, causes said first computer to communicate said first modification information to said second computer in response to performing the first modification and said second computer to communicate said second modification information to said first computer in response to performing the second modification; and
  computer readable program code which, when executed by said first and second computers, causes said first and second computers to modify during a first time interval said first data value and said second data value based on said second modification information and said first modification information, respectively, to restore consistency between said first and second data values, said first and second computers being operational throughout said first time interval.

26. The article of claim 25 wherein said computer readable program code for causing said first and second computers to modify said first data value and said second data value based on said second modification information and said first modification information, respectively, comprises computer readable program code which, when executed by said first computer, causes said first computer to identify exceptional occurrences.

27. The article of claim 26 further comprising computer readable code which, when executed by said first computer, causes said first computer to store said first modification information and information indicative of at least one of said exceptional occurrences in one or more database tables.

28. The article of claim 25 wherein said computer readable program code causing said first computer to perform a first modification to a first data value comprises computer readable program code which, when executed by said first computer, causes said first computer to set an indicator in said first computer to indicate that said first modification has been performed in said first computer.

29. A method for maintaining duplication between a first data value and a second data value stored in respective first and second computers, the first and second computers remaining operational throughout a time interval over which said method is performed, said method comprising the computer-implemented steps of:
  modifying the first data value so that the first data value is different from the second data value;
  communicating to the second computer information indicative of said step of modifying the first data value in response to said step of modifying the first data value;
  receiving in the second computer the information indicative of said step of modifying the first data value;
  modifying the second data value to duplicate the first data value in response to said step of receiving in the second computer;
  modifying the second data value so that the second data value is different from the first data value;
  communicating to the first computer information indicative of said step of modifying the second data value so that the second data value is different from the first data value, said step of communicating to the first computer being in response to said step of modifying the second data value so that the second data value is different;
  receiving in the first computer the information indicative of said step of modifying the second data value; and
  modifying the first data value to duplicate the second data value in response to said step of receiving in the first computer.

30. A computer-implemented method for peer-to-peer data replication comprising the steps of:
  storing first and second copies of a first data value in respective first and second computers, each copy of the first and second copies of the first data value being modifiable prior to modification of the other copy of the first and second copies of the first data value;
  performing a modification to any one of the first and second copies of the first data value to produce a second data value in a respective one of the first and second computers;
  communicating modification information indicative of said modification from the respective one of the first and second computers to the other computer of the first and second computers in response to said modification; and
  modifying the remaining copy of the first and second copies of the first data value to produce a copy of the second data value in the other computer based on the modification information.

31. The method of claim 30 further comprising the step of storing modification information in one or more tables in a database, said modification information being indicative of said step of performing a modification to any one of the first and second copies of the first data value.

32. The method of claim 31 wherein said step of storing modification information in one or more tables in a database comprises the step of queuing a plurality of database transactions in the one or more tables, the plurality of database transactions indicating operations necessary to replicate said step of performing a modification to any one of the first and second copies of the first data value.

33. The method of claim 31 wherein said step of storing modification information in one or more tables in a database comprises the step of storing an identification value in a transaction identification field of a transaction table, the identification value uniquely identifying the modification to any one of the first and second copies of the first data value.

34. The method of claim 31 wherein said step of storing modification information in one or more tables in a database comprises the step of storing information indicating a procedure executed to modify any one of the first and second copies of the first data value.

35. The method of claim 31 wherein said step of storing modification information in one or more tables in a database comprises the step of storing information indicating the second data value.

36. The method of claim 30 wherein said step of modifying the remaining copy of the first and second copies based on the modification information comprises the step of identifying one or more exceptional occurrences.

37. The method of claim 36 further comprising the step of storing in one or more tables the modification information and information indicative of the one or more exceptional occurrences.

38. The method of claim 30 wherein said step of modifying the remaining copy of the first and second copies based on the modification information comprises the step of executing a procedure to modify the remaining copy of the first and second copies of the first data value.

39. A computer system for peer-to-peer data replication, said computer system comprising:

means for storing first and second copies of a first data value in respective first and second computers of said computer system, each copy of the first and second copies of the first data value being modifiable prior to modification of the other copy of the first and second copies of the first data value;

means for performing a modification to any one of the first and second copies of the first data value to produce a second data value in a respective one of the first and second computers;

means for communicating modification information indicative of said modification from the respective one of the first and second computers to the other computer of the first and second computers in response to said modification; and means for modifying the remaining copy of the first and second copies of the first data value to produce a copy of the second data value in the other computer based on the modification information.

40. An article of manufacture comprising a computer-usable mass storage medium having computer readable program code embodied therein which, when executed by a first computer and a second computer, causes the first and second computers to perform computer-implemented peer-to-peer data replication by performing the steps of:

storing first and second copies of a first data value in the first and second computers, respectively, each copy of the first and second copies of the first data value being modifiable prior to modification of the other copy of the first and second copies of the first data value;

performing a modification to any one of the first and second copies of the first data value to produce a second data value in a respective one of the first and second computers;

communicating modification information indicative of said modification from the respective one of the first and second computers to the other computer of the first and second computers in response to said modification; and modifying the remaining copy of the first and second copies of the first data value to produce a copy of the second data value in the other computer based on the modification information.

41. A computer-implemented method for peer-to-peer data replication comprising the steps of:

storing a plurality of copies of a first data value in respective computers of a plurality of networked computers, each copy of the plurality of copies of the first data value being modifiable prior to modification of the others of the plurality of copies of the first data value;

performing a modification to any one of the plurality of copies of the first data value to produce a second data value in a respective one of the plurality of networked computers;

storing in a transaction table modification information indicating one or more database transactions executed to perform said modification, the transaction table including a transaction identifier field storing information uniquely identifying each of the one or more database transactions executed;

storing in a nodes table information indicating at least one other computer of the plurality of networked computers at which the one or more database transactions are to be executed;

communicating the modification information stored in the transaction table to each of the computers indicated by the information stored in the nodes table in response to said modification; and modifying remaining copies of the plurality of copies of the first data value to produce copies of the second data value based on the modification information.

42. A method for peer-to-peer data replication comprising the steps of:

storing first and second copies of a first data value in respective first and second computers, each copy of the first and second copies of the first data value being modifiable prior to modification of the other copy of the first and second copies of the first data value;

performing a modification to any one of the first and second copies of the first data value to produce a second data value in a respective one of the first and second computers;

communicating information that identifies a procedure for performing said modification from the respective one of the first and second computers to the other computer of the first and second computers; and executing the procedure in the other computer to modify the remaining copy of the first and second copies of the first data value to produce a copy of the second data value.

43. The method of claim 42 wherein the step of communicating information that identifies a procedure includes the step of executing a remote procedure call in the respective one of the first and second computers to invoke the procedure in the other computer.

44. The method of claim 42 further comprising the step of communicating to the other computer parameters that are used as arguments to the procedure when the procedure is executed.

45. The method of claim 42 further comprising the step comparing at least one of the parameters to the remaining copy of the first and second copies of the first data value to confirm that the first and second copies of the first data value were consistent prior to said step of performing a modification.

46. An article of manufacture comprising a computer-usable mass storage medium having computer readable program code embodied therein which, when executed by a first computer and a second computer, causes the first and second computers to perform peer-to-peer data replication by performing the steps of:

storing first and second copies of a first data value in the first and second computers, respectively, each copy of the first and second copies of the first data value being modifiable prior to modification of the other copy of the first and second copies of the first data value;

performing a modification to any one of the first and second copies of the first data value to produce a second data value in a respective one of the first and second computers;

communicating information that identifies a procedure for performing said modification from the respective one of the first and second computers to the other computer of the first and second computers; and executing the procedure in the other computer to modify the remaining copy of the first and second copies of the first data value to produce a copy of the second data value.

47. The article of claim 46 wherein the step of communicating information that identifies a procedure includes the step of executing a remote procedure call in the respective one of the first and second computers to invoke the procedure in the other computer.

\* \* \* \* \*